US009310977B2

(12) United States Patent
Ahmed et al.

(10) Patent No.: US 9,310,977 B2
(45) Date of Patent: Apr. 12, 2016

(54) MOBILE PRESENCE DETECTION

(71) Applicant: Biscotti Inc., McKinney, TX (US)

(72) Inventors: Syed Nadeem Ahmed, Allen, TX (US); Matthew B. Shoemake, Allen, TX (US)

(73) Assignee: Biscotti Inc., Plano, TX (US)

( * ) Notice: Subject to any disclaimer, the term of this patent is extended or adjusted under 35 U.S.C. 154(b) by 0 days.

(21) Appl. No.: 14/106,279

(22) Filed: Dec. 13, 2013

(65) Prior Publication Data

US 2014/0168071 A1 Jun. 19, 2014

Related U.S. Application Data

(60) Provisional application No. 61/877,928, filed on Sep. 13, 2013, provisional application No. 61/874,903, filed on Sep. 6, 2013, provisional application No. 61/872,603, filed on Aug. 30, 2013, provisional application No. 61/858,518, filed on Jul. 25, 2013, provisional application No. 61/759,621, filed on Feb. 1, 2013, provisional application No. 61/737,506, filed on Dec. 14, 2012.

(51) Int. Cl.
| | | |
|---|---|---|
| H04N 21/44 | (2011.01) | |
| G06F 3/0484 | (2013.01) | |
| H04L 29/08 | (2006.01) | |
| H04L 12/26 | (2006.01) | |
| H04N 5/232 | (2006.01) | |
| H04N 21/2743 | (2011.01) | |
| H04N 21/422 | (2011.01) | |
| H04N 21/4223 | (2011.01) | |

(52) U.S. Cl.
CPC ............. *G06F 3/0484* (2013.01); *H04L 43/04* (2013.01); *H04L 43/08* (2013.01); *H04L 67/02* (2013.01); *H04L 67/10* (2013.01); *H04N 5/23206* (2013.01); *H04N 21/2743* (2013.01); *H04N 21/4223* (2013.01); *H04N 21/42203* (2013.01); *H04N 21/44008* (2013.01)

(58) Field of Classification Search
None
See application file for complete search history.

(56) References Cited

U.S. PATENT DOCUMENTS

| | | |
|---|---|---|
| 5,243,510 A | 9/1993 | Cheney, II |
| 5,641,288 A | 6/1997 | Zaenglein, Jr. |
| 5,827,092 A | 10/1998 | Minich |
| 5,975,958 A | 11/1999 | Weidler |

(Continued)

FOREIGN PATENT DOCUMENTS

| | | |
|---|---|---|
| EP | 1814290 A2 | 8/2007 |
| JP | 2010/152866 A | 7/2010 |

(Continued)

OTHER PUBLICATIONS

Apple, iPhoto for Mac, 6 pages, Available at: https://www.apple.com/mac/iphoto/; Accessed on Feb. 28, 2014.

(Continued)

*Primary Examiner* — Cai Chen
(74) *Attorney, Agent, or Firm* — Swanson & Bratschun, L.L.C.

(57) ABSTRACT

Novel tools and techniques for collecting and using presence information. In accordance with some techniques, a presence detection device ("PDD") at a customer premises and/or another computer (such as a control server) can identify and/or authenticate a user. Once identified and/or authenticated, the user's profiles and/or media content may be sent to the PDD, and/or access to the user's profiles and/or media content may be provided to the PDD.

28 Claims, 5 Drawing Sheets

(56) References Cited

U.S. PATENT DOCUMENTS

| | | | |
|---|---|---|---|
| 6,058,307 A | 5/2000 | Garner | |
| 6,307,526 B1 | 10/2001 | Mann | |
| 6,614,465 B2 | 9/2003 | Alexander et al. | |
| 6,638,113 B2 | 10/2003 | Kajiwara et al. | |
| 6,717,607 B1 | 4/2004 | Lauper et al. | |
| 6,804,224 B1 | 10/2004 | Schuster et al. | |
| 7,039,393 B1 | 5/2006 | Kite | |
| 7,084,904 B2 | 8/2006 | Liu et al. | |
| 7,460,150 B1 | 12/2008 | Coughlan et al. | |
| 7,587,289 B1 | 9/2009 | Sivertsen | |
| 7,646,404 B2 | 1/2010 | Liu et al. | |
| 7,768,388 B2 | 8/2010 | Putterman et al. | |
| 8,063,929 B2 | 11/2011 | Kurtz et al. | |
| 8,122,491 B2 | 2/2012 | Yee et al. | |
| 8,144,182 B2 | 3/2012 | Shoemake et al. | |
| 8,239,903 B1 | 8/2012 | Campagna et al. | |
| 8,300,082 B2 | 10/2012 | Malik | |
| 8,325,213 B2 * | 12/2012 | Lamb et al. | 348/14.01 |
| 8,330,795 B2 | 12/2012 | Iyer et al. | |
| 8,366,487 B2 | 2/2013 | Weng et al. | |
| 8,395,652 B1 | 3/2013 | Chapweske et al. | |
| 8,416,715 B2 | 4/2013 | Rosenfeld et al. | |
| 8,566,838 B2 | 10/2013 | Sabin et al. | |
| 8,736,660 B2 | 5/2014 | Rosenberg | |
| 8,914,837 B2 | 12/2014 | Ahmed et al. | |
| 9,253,520 B2 | 2/2016 | Shoemake et al. | |
| 2001/0001159 A1 | 5/2001 | Ford | |
| 2001/0032246 A1 | 10/2001 | Fardella et al. | |
| 2002/0059094 A1 | 5/2002 | Hosea et al. | |
| 2002/0073420 A1 | 6/2002 | Yoon | |
| 2002/0085843 A1 | 7/2002 | Mann | |
| 2002/0118675 A1 | 8/2002 | Strathmeyer et al. | |
| 2003/0160871 A1 | 8/2003 | Pelletier et al. | |
| 2003/0200105 A1 | 10/2003 | Borden, IV et al. | |
| 2004/0027624 A1 | 2/2004 | Parulski et al. | |
| 2004/0061787 A1 | 4/2004 | Liu et al. | |
| 2004/0114919 A1 | 6/2004 | Rife | |
| 2004/0145658 A1 | 7/2004 | Lev-Ran et al. | |
| 2005/0007445 A1 | 1/2005 | Foote et al. | |
| 2005/0066357 A1 | 3/2005 | Ryal | |
| 2005/0086069 A1 | 4/2005 | Watson et al. | |
| 2005/0096084 A1 | 5/2005 | Pohja et al. | |
| 2005/0108092 A1 | 5/2005 | Campbell et al. | |
| 2005/0195954 A1 | 9/2005 | Klein et al. | |
| 2005/0246738 A1 * | 11/2005 | Lockett et al. | 725/43 |
| 2005/0283813 A1 | 12/2005 | Jamail et al. | |
| 2006/0031291 A1 | 2/2006 | Beckemeyer | |
| 2006/0107281 A1 * | 5/2006 | Dunton | 725/11 |
| 2006/0110136 A1 | 5/2006 | Abecassis | |
| 2006/0130118 A1 | 6/2006 | Damm | |
| 2006/0130119 A1 | 6/2006 | Candelore et al. | |
| 2006/0187306 A1 | 8/2006 | Matsui | |
| 2006/0209194 A1 | 9/2006 | Liu et al. | |
| 2006/0256133 A1 | 11/2006 | Rosenberg | |
| 2006/0268149 A1 | 11/2006 | Teng | |
| 2007/0050253 A1 | 3/2007 | Biggs et al. | |
| 2007/0067407 A1 | 3/2007 | Bettis et al. | |
| 2007/0161386 A1 | 7/2007 | Faber et al. | |
| 2007/0188597 A1 * | 8/2007 | Kenoyer | H04N 7/147 348/14.08 |
| 2007/0203708 A1 | 8/2007 | Polcyn et al. | |
| 2007/0204288 A1 | 8/2007 | Candelore | |
| 2007/0239825 A1 | 10/2007 | Walter | |
| 2007/0271580 A1 | 11/2007 | Tischer et al. | |
| 2008/0028318 A1 | 1/2008 | Shikuma | |
| 2008/0040380 A1 | 2/2008 | Miyaki | |
| 2008/0062253 A1 | 3/2008 | Jaspersohn et al. | |
| 2008/0152096 A1 | 6/2008 | Archer | |
| 2008/0189617 A1 | 8/2008 | Covell et al. | |
| 2008/0201369 A1 | 8/2008 | Cordoba | |
| 2008/0222673 A1 | 9/2008 | Durden et al. | |
| 2008/0270589 A1 | 10/2008 | Hwang | |
| 2008/0292139 A1 | 11/2008 | Wadhwa et al. | |
| 2008/0307105 A1 | 12/2008 | Sethi et al. | |
| 2009/0037945 A1 | 2/2009 | Greig et al. | |
| 2009/0079264 A1 | 3/2009 | Minami | |
| 2009/0232129 A1 | 9/2009 | Wong et al. | |
| 2009/0281897 A1 | 11/2009 | Antos | |
| 2010/0053555 A1 | 3/2010 | Enriquez et al. | |
| 2010/0060477 A1 * | 3/2010 | Laasik et al. | 340/825.69 |
| 2010/0064334 A1 * | 3/2010 | Blackburn et al. | 725/110 |
| 2010/0080418 A1 | 4/2010 | Ito | |
| 2010/0131363 A1 | 5/2010 | Sievert et al. | |
| 2010/0157013 A1 | 6/2010 | Sylvain | |
| 2010/0169410 A1 | 7/2010 | Lund et al. | |
| 2010/0218170 A1 | 8/2010 | MacLellan et al. | |
| 2010/0220188 A1 | 9/2010 | Renkis | |
| 2010/0232758 A1 | 9/2010 | Cook et al. | |
| 2010/0266111 A1 | 10/2010 | Crausaz et al. | |
| 2010/0306379 A1 | 12/2010 | Ferris | |
| 2010/0315482 A1 | 12/2010 | Rosenfeld et al. | |
| 2011/0029370 A1 | 2/2011 | Roeding et al. | |
| 2011/0035271 A1 | 2/2011 | Weaver et al. | |
| 2011/0069179 A1 | 3/2011 | Bathiche et al. | |
| 2011/0075011 A1 | 3/2011 | Abebe | |
| 2011/0153362 A1 | 6/2011 | Valin et al. | |
| 2011/0161163 A1 | 6/2011 | Carlson et al. | |
| 2011/0164044 A1 | 7/2011 | Huang | |
| 2011/0193971 A1 | 8/2011 | Lin | |
| 2011/0205329 A1 | 8/2011 | Willis | |
| 2011/0211678 A1 | 9/2011 | Woodworth et al. | |
| 2011/0213664 A1 | 9/2011 | Osterhout et al. | |
| 2011/0254914 A1 | 10/2011 | Ng | |
| 2011/0317587 A1 | 12/2011 | Lida et al. | |
| 2012/0002849 A1 | 1/2012 | Tokuse | |
| 2012/0019609 A1 | 1/2012 | Chang et al. | |
| 2012/0054809 A1 | 3/2012 | Chowdhury et al. | |
| 2012/0072936 A1 | 3/2012 | Small et al. | |
| 2012/0075168 A1 | 3/2012 | Osterhout et al. | |
| 2012/0081501 A1 | 4/2012 | Benzaia et al. | |
| 2012/0081502 A1 | 4/2012 | Naidu et al. | |
| 2012/0086785 A1 | 4/2012 | Valin et al. | |
| 2012/0102533 A1 | 4/2012 | Park | |
| 2012/0123786 A1 | 5/2012 | Valin et al. | |
| 2012/0133515 A1 | 5/2012 | Palshof | |
| 2012/0166517 A1 | 6/2012 | Lee et al. | |
| 2012/0189282 A1 | 7/2012 | Wyatt et al. | |
| 2012/0194553 A1 | 8/2012 | Osterhout et al. | |
| 2012/0203823 A1 | 8/2012 | Manglik et al. | |
| 2012/0206553 A1 * | 8/2012 | MacDonald | 348/14.01 |
| 2012/0207088 A1 | 8/2012 | Liu et al. | |
| 2012/0226752 A1 | 9/2012 | Jeong et al. | |
| 2012/0229591 A1 | 9/2012 | Lee | |
| 2012/0236107 A1 | 9/2012 | Rosenberg | |
| 2012/0236127 A1 | 9/2012 | Ojala et al. | |
| 2012/0266252 A1 | 10/2012 | Spiers et al. | |
| 2012/0268888 A1 | 10/2012 | Tian et al. | |
| 2012/0315793 A1 | 12/2012 | Hermann et al. | |
| 2012/0331113 A1 | 12/2012 | Jain et al. | |
| 2013/0007157 A1 | 1/2013 | Eftis et al. | |
| 2013/0046280 A1 | 2/2013 | Martin et al. | |
| 2013/0083150 A1 | 4/2013 | Howarter et al. | |
| 2013/0141518 A1 | 6/2013 | Chou | |
| 2013/0174194 A1 | 7/2013 | Mooneyham | |
| 2013/0231183 A1 | 9/2013 | Zalewski | |
| 2013/0265382 A1 | 10/2013 | Guleryuz et al. | |
| 2013/0265384 A1 | 10/2013 | Shoemake et al. | |
| 2013/0344961 A1 | 12/2013 | Iannetta | |
| 2014/0049593 A1 | 2/2014 | Pai et al. | |
| 2014/0123162 A1 | 5/2014 | Karlsson et al. | |
| 2014/0133658 A1 | 5/2014 | Mentz et al. | |
| 2014/0168056 A1 | 6/2014 | Swaminathan et al. | |
| 2014/0168344 A1 | 6/2014 | Shoemake et al. | |
| 2014/0168453 A1 | 6/2014 | Shoemake et al. | |
| 2014/0173675 A1 | 6/2014 | Ahmed et al. | |
| 2014/0247321 A1 | 9/2014 | Rosenberg | |
| 2014/0333713 A1 | 11/2014 | Shoemake et al. | |
| 2014/0359647 A1 | 12/2014 | Shoemake et al. | |
| 2014/0362170 A1 | 12/2014 | Walker | |
| 2014/0375752 A1 | 12/2014 | Shoemake et al. | |
| 2015/0026708 A1 | 1/2015 | Ahmed et al. | |
| 2015/0070516 A1 | 3/2015 | Shoemake et al. | |
| 2015/0085056 A1 | 3/2015 | Van Broeck | |
| 2015/0138303 A1 | 5/2015 | White | |

(56) References Cited

U.S. PATENT DOCUMENTS

| | | | |
|---|---|---|---|
| 2015/0243163 A1 | 8/2015 | Shoemake |
| 2015/0244807 A1 | 8/2015 | Shoemake et al. |
| 2015/0324076 A1 | 11/2015 | Ahmed et al. |
| 2015/0334344 A1 | 11/2015 | Shoemake et al. |

FOREIGN PATENT DOCUMENTS

| | | | |
|---|---|---|---|
| KR | 2010/0062559 A | 6/2010 |
| KR | 2012/0139251 A | 12/2012 |
| WO | WO 2010/118202 A1 | 10/2010 |
| WO | WO 2010/147281 A1 | 12/2010 |
| WO | WO 2012/076724 A1 | 6/2012 |
| WO | WO 2014/093931 A1 | 6/2014 |
| WO | WO 2014/093932 A1 | 6/2014 |
| WO | WO 2014/093933 A1 | 6/2014 |
| WO | WO 2014/121148 A1 | 8/2014 |
| WO | WO 2015/013592 A1 | 1/2015 |
| WO | WO 2015/031671 A1 | 3/2015 |
| WO | WO 2015/035247 A1 | 3/2015 |

OTHER PUBLICATIONS

Apple, OS X Mavericks, Mac App Store, 5 pages, Available at: http://www.apple.com/osx/apps/app-store.html; Accessed on Feb. 28, 2014.
Saint-Andre, Extensible Messaging and Presence Protocol (XMPP): Core, Jabber Software Foundation (Oct. 2004), 73 pages, Available at: http://xmpp.org/rfcs/rfc3920.html, Accessed on Feb. 28, 2014.
Google, Google Play, 3 pages, Available at: https://play.google.com/store?hl=en, Accessed on Feb. 28, 2014.
Google, Google Apps for Business, 2 pages, Available at: http://www.google.com/enterprise/apps/business/, Accessed on Feb. 28, 2014.
Netflix, Watch TV Shows Online, Watch Movies Online, 1 page, Available at: https://www.netflix.com/?locale=en-US, Accessed on Feb. 28, 2014.
Rosenberg, Simple Made Simple: An Overview of the IETF Specifications for Instant Messaging and Presence Using the Session Initiation Protocol (SIP) (Apr. 2013), Available at: https://tools.ietf.org/html/rfc6914, Accessed on Feb. 28, 2014.
Wikipedia, the free encyclopedia, Face Detection, 2 pages, Available at: http://en.wikipedia.org/wiki/Face_detection, Accessed on Feb. 28, 2014.
Wikipedia, the free encyclopedia, Face Recognition System, 10 pages, Available at: http://en.wikipedia.org/wiki/Facial_recognition_system, Accessed on Feb. 28, 2014.
Wikipedia, the free encyclopedia, SIMPLE, 3 pages, Available at: http://en.wikipedia.org/wiki/SIMPLE, Accessed on Feb. 28, 2014.
Wikipedia, the free encyclopedia, Speech Recognition, 14 pages, Available at: http://en.wikipedia.org/wiki/Speech_recognition, Accessed on Feb. 28, 2014.
Wikipedia, the free encyclopedia, XMPP, 10 pages, Available at http://en.wikipedia.org/wiki/XMPP, Accessed on Feb. 28, 2014.
Amazon "Amazon Cloud Front Documentation" 3 pages, Available at: http://aws.amazon.com/documentation/cloudfront/; Accessed on Feb. 25, 2014.
AWS, Amazon Elastic Compute Cloud (EC2), Amazon Web Services LLC, 6 pages, Available at: http://aws.amazon.com/ec2/; Accessed on Mar. 3, 2014.
AWS, Amazon Simple Storage Service, Amazon Web Services, Inc., 6 pages, Available at: http://aws.amazon.com/s3/; Accessed on Mar. 3, 2014.
Amazon "Amazon Simple Storage Service Getting Started Guide" Mar. 1, 2006, 20 pages, Amazon Web Services LLC.
Anderson "SETI@home: An Experiment in Public-Resource Computing" (Nov. 2002) 8 pages, Space Sciences Laboratory, U.C. Berkeley.
Apple "Apple TV 3rd Generation Setup Guide" 36 pages.
Apple, "iOS 8 FaceTime" video calling service; Available at: http://www.apple.com/ios/facetime/; Accessed on Oct. 2, 2014; 3 pages.

Biscotti camera products; Available at: http://biscotti.com/biscotti; Accessed on Oct. 2, 2014; 1 page.
Blue Host, "The Best Web Hosting", Available at: http://www.bluehost.com/; Accessed on Oct. 2, 2014; 3 pages.
BlueJeans Network; Multi-Party Conferencing in the Cloud; Available at: http://www.bluejeans.com; Accessed on Oct. 2, 2014; 3 pages.
Cerf et al. (1974) "Specification of Internet Transmission Control Program" Network Working Group; 70 pages.
Cisco Collaboration Endpoints; Video calling cameras and systems; Available at: http://www.cisco.com/c/en/us/products/collaboration-endpoints/product-listing.html; Accessed on Oct. 2, 2014; 2 pages.
Data Center Virtualization and Cloud Infrastructure Products; Available at: http://www.vmware.com/products/datacenter-virtualization/; Accessed on Feb. 25, 2014; 5 pages.
DECT "Part 6: Identities and addressing" (Feb. 1998) European Standard (Telecommunications series); 41 pages.
Domain Discover.US "Put Yourself on the Web"; Available at: https://www.tierra.net/domains; 3 pages.
Dropbox Review and Rating, Available at: http://www.pcmag.com/article2/0,2817,2343852,00.asp, Accessed on Feb. 25, 2014, 12 pages.
Fielding et al. (1999) "Hypertext Transfer Protocol—HTTP/1.1" Network Working Group; 114 pages.
Google website; Available at: https://www.google.com/; Accessed on Oct. 2, 2014; 1 page.
HD Wi-Fi video monitoring cameras for iPhone, Android or computer; Dropcam, Inc., Available at: http://web.archive.org/web/20121213184724/https://www.dropcam.com/; Accessed on Feb. 28, 2014, 3 pages.
Information Sciences Institute (1981) "Internet Protocol"; Available at: http://www.ietf.org/rfc/rfc791.txt; Accessed on Oct. 2, 2014; 48 pages.
International Telecommunication Union; E.164: The international public telecommunication numbering plan; Available at: http://www.itu.int/rec/T-REC-E.164/en; Accessed on Oct. 2, 2014; 1 page.
International Telecommunication Union; G.711: Pulse code modulation (PCM) of voice frequencies; Available at: http://www.itu.int/rec/T-REC-G.711; Accessed on Oct. 2, 2014; 1 page.
International Telecommunication Union; G.722: 7kHz audio-coding within 64 kbit/s; Available at: http://www.itu.int/rec/T-REC-G.722; Accessed on Oct. 2, 2014; 1 page.
IP Version 6 Working Group (ipv6); Available at: http://datatracker.ietf.org/wg/ipv6/charter/; Accessed on Oct. 2, 2014; 3 pages.
ITU-T (2007) "H.264 Series H: Audiovisual and Multimedia Systems"; 564 pages.
Johnny Chung Lee Projects—Wii www.johnnylee.net/projects/wii/ Accessed on Sep. 5, 2013, 3 pages.
Lifesize; Video Conference Systems and Accessories; Available at: http://www.lifesize.com/en/products/video-conferencing-systems-and-accessories; Accessed on Oct. 2, 2014; 11 pages.
Linux Foundation, "Why the Xen Project?", Available at: http://www.xenproject.org/users/why-the-xen-project.html, Accessed on Feb. 25, 2014, 5 pages.
Logitech Business Webcams; Available at: http://www.logitech.com/en-us/for-business/products/webcams; Accessed on Oct. 2, 2014; 4 pages.
Ludwig, XEP-0166: Jingle; Available at: http://xmpp.org/extensions/xep-0166.html; Accessed on Oct. 2, 2014; 49 pages.
Mahy et al. (2010) Traversal Using Relays around NAT (TURN): Relay Extensions to Session Traversal Utilities for NAT (STUN); Available at: http://tools.ietf.org/html/rfc5766; Accessed on Oct. 2, 2014; 134 pages.
Microsoft, Xbox Games and Entertainment on All Your Devices; Available at: http://www.xbox.com/en-US/#fbid=_oRvaiAGfk1; Accessed on Oct. 2, 2014; 2 pages.
NEST, Learning Thermostat™ User Guide, 8 pages.
Nielson People Meters; Available at: http://www.nielsen.com/content/corporate/us/en/solutions/measurement/television.html Accessed on Oct. 2, 2014; 4 pages.
Notification Concerning Availability of Publication of the International Application; PCT Patent Application No. PCT/US2013/075184; mailed Jun. 19, 2014; 1 page.

(56) References Cited

OTHER PUBLICATIONS

Notification Concerning Availability of Publication of the International Application; PCT Patent Application No. PCT/US2013/075185; mailed Jun. 19, 2014; 1 page.
Notification Concerning Availability of Publication of the International Application; PCT Patent Application No. PCT/US2013/075186; mailed Jun. 19, 2014; 1 page.
Notification Concerning Availability of Publication of the International Application; PCT Patent Application No. PCT/US2014/014321; mailed Aug. 7, 2014; 1 page.
Notification of Transmittal of the International Search Report and the Written Opinion of the International Searching Authority, or the Declaration for PCT International Application No. PCT/US13/075184; mailed May 13, 2014; 15 pages.
Notification of Transmittal of the International Search Report and the Written Opinion of the International Searching Authority, or the Declaration for PCT International Application No. PCT/US13/075185; mailed Apr. 7, 2014; 12 pages.
Notification of Transmittal of the International Search Report and the Written Opinion of the International Searching Authority, or the Declaration for PCT International Application No. PCT/US13/75186; mailed May 1, 2014; 11 pages.
Notification of Transmittal of the International Search Report and the Written Opinion of the International Searching Authority, or the Declaration for PCT International Application No. PCT/US14/14321; mailed May 9, 2014; 18 pages.
Nygren, The Akamai Network: A Platform for High-Performance Internet Applications, Akamai Technologies, Cambridge, US, 18 pages.
Oracle VM VirtualBox, 2 pages, Available at: https://www.virtualbox.org/, Accessed on Feb. 25, 2014.
Panasonic (2011) Operating Instructions: KX-TG9471 and KX-TG9472; 64 pages.
Pantos et al. (2013) "HTTP Live Streaming"; Available at: http://tools.ietf.org/html/draft-pantos-http-live-streaming-11; Accessed on Oct. 2, 2014; 74 pages.
Polycom Data Sheet; Polycom® VoiceStation® 300 "Crystal-clear conferencing for smaller rooms and desktops"; 2013 Polycom, Inc.; 2 pages.
Polycom; Polycom HDX Series Product Brochure; Available at: http://www.polycom.com/content/dam/polycom/common/documents/brochures/hdx-family-br-enus.pdf; Accessed on Oct. 2, 2014; 4 pages.
Polycom User Guide; VoiceStation™ 300; Polycom, Inc.; http://www.polycom.com; 17 pages.
Postel (1982) "Simple Mail Transfer Protocol" Info Sciences Institute, USC; 71 pages.
QEMU, Open Source Processor Emulator, 2 pages, Available at: http://wiki.qemu.org/Main_Page, Accessed on Mar. 4, 2014.
Roku, User Guide (2008-2009), 51 pages,Roku, Inc.
Rosenberg (2010) "Interactive Connectivity Establishment (ICE): A Protocol for Network Address Translator (NAT) Traversal for Offer/Answer Protocols"; Available at: http://tools.ietf.org/html/rfc5245; Accessed on Oct. 12, 2014; 234 pages.
Rosenberg et al. "Session Traversal Utilities for NAT (STUN)"; Available at: http://tools.ietf.org/html/rfc5389; Accessed on Oct. 12, 2014; 102 pages.
Rosenberg, et al. (2002) "SIP: Session Initiation Protocol" http://www.ietf.org/rfc/rfc3261.txt; Accessed on Jun. 27, 2014; 265 pages.
Skype video calling service; Available at: www.skype.com/en/; Accessed on Oct. 2, 2014; 4 pages.
Softlayer Services®, 2 pages, Available at: http://www.softlayer.com/services/storagelayer, Accessed on Mar. 4, 2014.
SPEEX: A Free Codec for Free Speech; Available at: http://www.speex.org; Accessed on Oct. 12, 2014; 2 pages.
U.S. Appl. No. 12/561,165; Notice of Allowance dated Feb. 2, 2012; 12 pages.
U.S. Appl. No. 13/857,736; Notice of Publication dated Oct. 10, 2013; 1 page.
U.S. Appl. No. 13/857,736; Ex Parte Quayle Office Action dated Sep. 16, 2014; 8 pages.
U.S. Appl. No. 13/857,736; Notice of Allowance dated Oct. 10, 2014; 9 pages.
U.S. Appl. No. 14/106,263; NonFinal Office Action dated Mar. 6, 2014; 20 pages.
U.S. Appl. No. 14/106,263; Final Office Action dated Jun. 13, 2014; 21 pages.
U.S. Appl. No. 14/106,263; Notice of Publication dated Jun. 19, 2014; 1 page.
U.S. Appl. No. 14/106,360; NonFinal Office Action dated Mar. 20, 2014; 22 pages.
U.S. Appl. No. 14/106,360; Notice of Publication dated Jun. 19, 2014; 1 page.
U.S. Appl. No. 14/170,499; Notice of Publication dated Jun. 19, 2014; 1 page.
U.S. Appl. No. 14/170,499, NonFinal Office Action dated Jul. 18, 2014; 19 pages.
U.S. Appl. No. 14/341,009, filed Jul. 25, 2014; 89 pages.
U.S. Appl. No. 14/464,435, filed Aug. 20, 2014; 111 pages.
U.S. Appl. No. 14/472,133, filed Aug. 28, 2014; 123 pages.
U.S. Appl. No. 14/479,169, filed Sep. 5, 2014; 99 pages.
Varia et al., Overview of Amazon Web Services (Jan. 2014), 22 pages, Amazon Web Services.
Variable Frame Rate MP4; https://kb.speeddemosarchive.com/Variable_Frame_Rate_MP4; Accessed on Jun. 27, 2014; 3 pages.
Vidyo, "The Vidyo Experience"; Available at: http://www.vidyo.com/products/use/; Accessed on Oct. 2, 2014; 5 pages.
WebRTC; Available at: http://www.webrtc.org; Accessed on Oct. 2, 2014; 4 pages.
WebSocket.org, Are you plugged in?; "What is WebSocket?"; Available at: http://www.websocket.org; Accessed on Oct. 2, 2014; Kaazing Corporation; 1 page.
Wikipedia, the free encyclopedia, Apache HTTP Server, 5 pages, Available at: http://en.wikipedia.org/wiki/Apache_HTTP_Server, Accessed on Feb. 26, 2014.
Wikipedia, the free encyclopedia; "Audio to Video Synchronization" Available at: http://en.wikipedia.org/wiki/Audio_to_video_synchronization; Accessed on Jun. 27, 2014; 6 pages.
Wikipedia, the free encyclopedia; "Cloud computing" Available at: en.wikipedia.org/wiki/Cloud_computing Retrieved Mar. 3, 2014; 34 pages.
Wikipedia, the free encyclopedia; "Cloud storage" Available at: en.wikipedia.org/wiki/Cloud-storage; Retrieved Mar. 3, 2014; 5 pages.
Wikipedia, the free encyclopedia; "cPanel" Available at: http://en.wikipedia.org/wiki/Cpanel; Accessed on Feb. 26, 2014; 4 pages.
Wikipedia, the free encyclopedia; "Distributed computing" Available at: http://en.wikipedia.org/wiki/Distributed_computing; Accessed on Feb. 26, 2014; 12 pages.
Wikipedia, the free encyclopedia; "Email" Available at: en.wikipedia.org/wiki/Email; Retrieved Mar. 3, 2014; 25 pages.
Wikipedia, the free encyclopedia; "Grid computing" Available at: http://en.wikipedia.org/wiki/Grid_computing; Accessed on Feb. 26, 2014; 12 pages.
Wikipedia, the free encyclopedia; "Hypertext Transfer Protocol" Available at: en.wikipedia.org/wiki/Http; Retrieved Mar. 3, 2014; 10 pages.
Wikipedia, the free encyclopedia; "MPEG-4 Part 14" container format; Available at: http://en.wikipedia.org/wiki/MPEG-4; Accessed on Jun. 27, 2014; 4 pages.
Wikipedia, the free encyclopedia, "PlayStation 4" Available at: http://en.wikipedia.org/wiki/PlayStation_4, Accessed on Feb. 25, 2014, 21 pages.
Wikipedia, the free encyclopedia; "Session Initiation Protocol" Available at: http://en.wikipedia.org/wiki/Session_Initiation_Protocol; Accessed Jun. 27, 2014; 6 pages.
Wikipedia, the free encyclopedia; "Time-lapse photography" Available at en.wikipedia.org/wiki/ Time-lapse_photography; Retrieved Mar. 3, 2014; 11 pages.
Wikipedia, the free encyclopedia; "Transmission Control Protocol" Available at: en.wikipedia.org/wiki/Transmission_Control_Protocol; Retrieved Mar. 3, 2014; 19 pages.

(56) References Cited

OTHER PUBLICATIONS

Wikipedia, the free encyclopedia; "VP8" Available at: http://en.wikipedia.org/wiki/VP8; Retrieved Oct. 12, 2014; 8 pages.
Wikipedia, the free encyclopedia; "Wii" Available at: http://en.wikipedia.org/wiki/Wii; Accessed on Feb. 25, 2014; 30 pages.
Wikipedia, the free encyclopedia; "Wolfram Alpha" Available at: http://en.wikipedia.org/wiki/Wolfram_Alpha; Accessed on Feb. 25, 2014; 6 pages.
Wikipedia, the free encyclopedia; "Xbox One" Available at: http://en.wikipedia.org/wiki/Xbox_one; Accessed on Feb. 25, 2014; 16 pages.
XMPP Standards Foundation; Available at: http://xmpp.org/xmpp-protocols/; Accessed on Oct. 2, 2014; 1 page.
Young (1998) "FundamentalsImageProcessing," 113 pages.
Zoom Video Communications, Inc.; Zoom Cloud Video Conferencing; Available at: http://www.zoom.us; Accessed on Oct. 2, 2014; 2 pages.
Google "How Set Up Google Chromecast?" Available at googlechromecast.com/how-set-up-google-chromecast/, retrieved on Apr. 29, 2014, 25 pages.
Google "What is Google Chromecast?" Available at googlechromecast.com/what-is-google-chromecast/ retrieved on Apr. 29, 2014, 6 pages.
Notification Concerning Transmittal of International Preliminary Report on Patentability by the International Bureau of WIPO for PCT International Application No. PCT/US13/75184; mailed Jun. 25, 2015; 11 pages.
Notification Concerning Transmittal of International Preliminary Report on Patentability by the International Bureau of WIPO for PCT International Application No. PCT/US13/75185; mailed Jun. 25, 2015; 9 pages.
Notification Concerning Transmittal of International Preliminary Report on Patentability by the International Bureau of WIPO for PCT International Application No. PCT/US13/75186; mailed Jun. 25, 2015; 8 pages.
Notification of Transmittal of the International Search Report and the Written Opinion of the International Searching Authority, or the Declaration for PCT International Application No. PCT/US14/48158; mailed Nov. 10, 2014; 12 pages.
Notification of Transmittal of the International Search Report and the Written Opinion of the International Searching Authority, or the Declaration for PCT International Application No. PCT/US14/53254; mailed Dec. 15, 2014; 11 pages.
Notification of Transmittal of the International Search Report and the Written Opinion of the International Searching Authority, or the Declaration for PCT International Application No. PCT/US14/54409; mailed Dec. 16, 2014; 16 pages.
U.S. Appl. No. 14/106,263; NonFinal Office Action dated Mar. 24, 2015; 48 pages.
U.S. Appl. No. 14/106,360; Notice of Allowance dated Oct. 29, 2014; 22 pages.
U.S. Appl. No. 14/170,499; NonFinal Office Action dated Feb. 9, 2015; 39 pages.
U.S. Appl. No. 14/170,499; NonFinal Office Action dated Jun. 3, 2015; 31 pages.
U.S. Appl. No. 14/341,009; NonFinal Office Action dated Apr. 22, 2015; 39 pages.
U.S. Appl. No. 14/464,435; NonFinal Office Action dated Feb. 12, 2015; 33 pages.
U.S. Appl. No. 14/472,133; NonFinal Office Action dated Feb. 11, 2015; 34 pages.
Wikipedia, the free encyclopedia; "Bluetooth" Available at: en.wikipedia.org/wiki/Bluetooth; retrieved on Apr. 29, 2014; 25 pages.
Wikipedia, the free encyclopedia; "Wi-Fi Direct" Available at: en.wikipedia.org/wiki/Wi-Fi_Direct; Retrieved on Apr. 29, 2014; 5 pages.
U.S. Appl. No. 14/106,263; Notice of Allowance dated Sep. 25, 2015; 24 pages.
U.S. Appl. No. 14/170,499; Notice of Allowance dated Nov. 5, 2015; 31 pages.
U.S. Appl. No. 14/341,009; Final Office Action dated Oct. 8, 2015; 35 pages.
U.S. Appl. No. 14/464,435; Final Office Action dated Sep. 21, 2015; 26 pages.
U.S. Appl. No. 14/472,133; Final Office Action dated Sep. 22, 2015; 26 pages.
U.S. Appl. No. 14/479,169; NonFinal Office Action dated Sep. 18, 2015; 76 pages.
U.S. Appl. No. 14/539,106; NonFinal Office Action dated Sep. 15, 2015; 45 pages.
Notification Concerning Transmittal of International Preliminary Report on Patentability by the International Bureau of WIPO for PCT International Application No. PCT/US14/14321; mailed Aug. 13, 2015; 11 pages.
U.S. Appl. No. 14/479,169; Final Office Action dated Feb. 5, 2016; 168 pages.
Notification Concerning Transmittal of International Preliminary Report on Patentability by The International Bureau of WIPO for PCT International Application No. PCT/US14/48158; dated Jan. 26, 2016; 9 pages.

* cited by examiner

MOBILE PRESENCE DETECTION

CROSS-REFERENCES TO RELATED APPLICATIONS

This application claims the benefit, under 35 U.S.C. §119 (e), of the following applications: provisional U.S. Patent Application No. 61/877,928, filed Sep. 13, 2013 by Ahmed et al. and titled "Mobile Presence Detection" (referred to herein as the "'928 application"); provisional U.S. Patent Application No. 61/874,903, filed Sep. 6, 2013 by Shoemake et al. and titled "Virtual Window" (referred to herein as the "'903 application"); provisional U.S. Patent Application No. 61/872,603, filed Aug. 30, 2013 by Shoemake et al. and titled "Physical Presence and Advertising" (referred to herein as the "'603 application"); provisional U.S. Patent Application No. 61/858,518, filed Jul. 25, 2013 by Shoemake et al. and titled "Video Calling and Conferencing Advertising" (referred to herein as the "'518 application"); provisional U.S. Patent Application No. 61/759,621, filed Feb. 1, 2013 by Shoemake et al. and titled "Video Mail Capture, Processing and Distribution" (referred to herein as the "'621 application"); and provisional U.S. Patent Application No. 61/737,506, filed Dec. 14, 2012 by Shoemake et al. and titled "Video Capture, Processing and Distribution System" (referred to herein as the "'506 application"). This application may also be related to U.S. patent application Ser. No. 14/106,360, filed on a date even herewith by Ahmed et al. and titled "Distributed Infrastructure", referred to herein as the "Distributed Infrastructure Application") and to U.S. patent application Ser. No. 14/106,263, filed on a date even herewith by Ahmed et al. and titled "Video Capture, Processing and Distribution".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools and techniques for detecting the physical presence of a user near a user device and delivering content, services, or other user information to that user based on the detected presence.

BACKGROUND

Video calling (also called video conferencing) is a promising technology to allow friends and family to interact both aurally and visually, even when far apart. There are professional-grade systems, such as those available from POLYCOM and others, but such professional-grade systems require complex hardware that is both prohibitively expensive and difficult to use.

At the other end of the spectrum lie solutions based on a personal computer ("PC"), such as web cams and video chat software available from SKYPE and others. While relatively inexpensive, however, such PC-based solutions have several shortcomings of their own. As an initial matter, the call quality of a video call using such solutions is far from optimal, and the software and hardware required to implement them can be confusing and error-prone. Perhaps more importantly, such solutions tether the user to a personal computer, which is often located in an office or study, and they generally, therefore, cannot provide an inclusive experience for an entire family.

More recently, several solutions have emerged to address this need. For example, the Biscotti™ device, available from Biscotti Inc., provides an inexpensive tool to allow video calling using a high-definition television and an Internet connection. More generally, a class of devices, which have been described as "video calling devices" but are referred to herein as "video communication devices" (or "VCD") can be simultaneously connected to a display (such as a television, to name one example) and a source of content (such as a set-top box ("STB"), to name an example) in a pass-through configuration and can have a network connection and/or sensors such as a camera, a microphone, infrared sensors, and/or other suitable sensors. Such devices present a powerful platform for various applications. Examples include, without limitation, video calling, instant messaging, presence detection, status updates, media streaming over the Internet, web content viewing, gaming, and DVR capability.

Such platforms and capabilities provide additional opportunities for enhanced applications, such as those described in further detail below.

BRIEF SUMMARY

A set of embodiments provides tools and techniques to detect the presence of a user and deliver content, services, or other information to that user (e.g., to the device that detected the presence of the user) based on the detected presence. In an aspect of some embodiments, this presence detection can be performed automatically, requiring no interaction from the user at all (other than being sensed by the sensors used for presence detection). Hence, for example, a user, upon standing in front of a presence detection device ("PDD"), could have some or all of the content owned by that user downloaded to that PDD without requiring any action by the user at all. Such content might be stored on a user device at the user's home (and accessed through the cloud) and/or it might be stored in the cloud (such as in a cloud storage system, or the like).

The tools provided by various embodiments include, without limitation, methods, systems, and/or software products. Merely by way of example, a method might comprise one or more procedures, any or all of which are executed by a PDD and/or a computer system. Correspondingly, an embodiment might provide a PDD and/or a computer system configured with instructions to perform one or more procedures in accordance with methods provided by various other embodiments. Similarly, a computer program might comprise a set of instructions that are executable by a PDD and/or a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a method might comprise collecting presence information with a first presence detection device ("PDD"). In some instances, the first PDD might comprise a video input interface to receive video input from a local content source (which, in some embodiments, might include a set-top box ("STB") and/or the like), an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and a storage medium in communication with the at least one processor. The method might further comprise detecting presence of a user, with the first PDD, based at least in part on the presence information. In some cases, the method might comprise identifying the user, with a first computer, based at least in part on identifying information derived from at least a portion of the presence information, and delivering user information to the user, with a second computer, based on the detected presence of the identified user.

In some instances, the video input interface and the audio input interface might both be embodied as a first high definition multimedia interface ("HDMI") port communicatively coupled to the local content source via a first HDMI cable. Similarly, the video output interface and the audio output interface might both be embodied as a second HDMI port communicatively coupled to the video display device via a second HDMI cable. The audio receiver might be incorporated within the video display device.

In some embodiments, the second computer and the first computer might be the same computer. In some cases, at least one of the first computer or the second computer might be the first PDD, while, in other cases, at least one of the first computer or the second computer might be a control server in communication with the first PDD over a network. Where at least one of the first computer or the second computer is the control server, delivering user information to the user might, in some instances, comprise instructing the first PDD to deliver the user information to the user.

According to some embodiments, delivering the user information to the user might comprise delivering the user information over at least one of the video output interface or the audio output interface to a corresponding one of the video display device or the audio receiver. In some cases, delivering the user information to the user might comprise obtaining the user information from one or more of a location in a cloud computing system or a second PDD remote from the first PDD. In some cases, where the user information is obtained from the second PDD remote from the first PDD, the second PDD might be at least one of a user device owned by the user or a user device associated with the user.

In some embodiments, the method might further comprise detecting, with the first PDD, that the user is no longer present. In cases in which delivering user information to the user comprises transmitting the user information to the first PDD, the method, according to some embodiments, might further comprise removing the user information from the first PDD, based on a determination that the user is no longer present.

The user information, in some embodiments, might comprise at least one of video content, audio content, video game content, image content, or a software application. In some cases, each of the at least one of video content, audio content, video game content, image content, or the software application is one of purchased content, rented content, freely downloaded content, or user-generated content. In some instances, the user information might comprise a user profile, which might comprise one or more of: user profile information for a video game or video game console, saved game information, user profile information for video or audio content, user browser history, user profile information for recommended content, user profile information for contact information of contacts of the user, user profile information for one or more cloud services, or user profile information for device preferences. According to some embodiments, the user profile might comprise biometric information of the user selected from a group consisting of facial characteristics of the user, voice characteristics of the user, fingerprint characteristics of the user, iris characteristics of the user, pupil characteristics of the user, and retinal characteristics of the user. Delivering the user information might comprise logging into a service, from the first PDD, with a credential of the user. The service, according to some embodiments, might be a video calling service. In some cases, the service might be a content subscription service.

According to some embodiments, collecting presence information might comprise collecting presence information automatically, without user interaction. In alternative embodiments, collecting presence information might utilize user interaction. In some instances, identifying the user might comprise authenticating the user, which in some cases might permit delivery of the user information. In some cases, the presence information might comprise at least one of an image captured by the video capture device, a video segment captured by the video capture device, an audio sample captured by the audio capture device, or a detected presence of a user device in proximity to the first PDD.

Identifying the user, in some instances, might comprise analyzing, with the first computer, at least one of captured image data or captured video data, using facial recognition software. In some cases, identifying the user might comprise comparing, with the first computer, the captured audio data with a voiceprint. In some embodiments, identifying the user might comprise comparing, with the first computer, at least a portion of the captured audio data with stored challenge/response information. Identifying the user might, according to some embodiments, comprise determining, with the first computer, whether a user device that is detected in proximity to the first PDD is a device associated with the user. In some instances, the method might further comprise detecting a presence of the user device that is associated with the user, based on at least one of detecting a Bluetooth connection of the user device, detecting that the user device is associated with a WiFi access point with which the first PDD has associated, or communicating with the user device using near field communication ("NFC").

The first PDD might be a video game console, according to some embodiments. In some cases, the first PDD might be a user device selected from a group consisting of a laptop computer, a desktop computer, a mobile phone, a smart phone, a tablet computer, a personal computer, and a video communication device (for example, as described in U.S. patent application Ser. No. 12/561,165, filed Sep. 16, 2009 by Shoemake et al. and titled "Real Time Video Communications System" (issued as U.S. Pat. No. 8,144,182 and referred to herein as the "'182 patent," the disclosure of which is hereby incorporated by reference for all purposes)).

In another aspect, a presence detection device might comprise a video input interface to receive video input from a local content source, an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and/or a storage medium in communication with the at least one processor. The network interface (in some embodiments) might be configured to communicate with at least one of an access point, a computer over a network, a second presence detection device over the network, or a user device in proximity to the presence detection device. The storage medium might have encoded thereon a set of instructions executable by the at least one processor to control operation of the presence detection device.

The set of instructions might comprise instructions to collect presence information about a user, and instructions to detect presence of the user, based at least in part on the presence information. The set of instructions might further comprise instructions to transmit, over the network interface, identifying information to a server over a network, based on detected presence of the user, for the server to identify the user, the identifying information being derived from at least a portion of the presence information. The set of instructions might also comprise instructions to receive, over the network interface, user information based on an identity of the detected use, and instructions to present the user information to the user, based on the detected presence of the identified user.

In yet another aspect, a system might comprise a computer and one or more presence detection devices. The computer might comprise at least one first processor and a first storage medium in communication with the at least one first processor, the first storage medium having encoded thereon a first set of instructions executable by the at least one first processor to control operation of the one or more presence detection devices. Each of the one or more presence detection devices might comprise a video input interface to receive video input from a local content source, an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one second processor, and a second storage medium in communication with the at least one second processor. The second storage medium might have encoded thereon a second set of instructions executable by the at least one second processor to control operation of said presence detection device of the one or more presence detection devices.

The second set of instructions might comprise instructions to collect presence information and instructions to detect presence of a user, based at least in part on the presence information. At least one of the first set of instructions or the second set of instructions might comprise instructions to identify the user, based at least in part on identifying information derived from at least a portion of the presence information The at least one of the first set of instructions or the second set of instructions might further comprise instructions to deliver user information to the user, based on the detected presence of the identified user.

In some embodiments, the computer might be a server computer that is remote from the one or more presence detection devices, and in communication with at least one of the one or more presence detection devices over a network. In some cases, the computer might be embodied in at least one of the one or more presence detection devices.

Merely by way of example, a method might comprise collecting presence information, about a user, with a user device (such as a presence detection device or a video communication device, to name a few examples). The method might further comprise detecting presence of the user, with a computer (which could be the user device or another computer in communication with the user device), based on the presence information. In some embodiments, the method can include identifying the user, with the computer, based on the presence information, and/or delivering information to the user, with the computer, based on the detected presence of the identified user.

A method in accordance with other embodiments might comprise receiving, with a server computer and over a network, presence information from a user device. In some cases, the method can further comprise detecting, with the server computer, presence of a user, based on the presence information, and/or identifying, with the server computer, the user, based at least in part on the presence information. In a particular embodiment, the method might comprise determining, with the server computer, a location of the user and/or delivering, with the computer, information to the user at the location of the user.

A system in accordance with another set of embodiments might comprise a computer. In an aspect, the computer might comprise one or more processors and/or a computer readable medium in communication with the one or more processors. In an embodiment, the computer readable medium can have encoded thereon a set of instructions executable by the computer system to perform one or more operations. In an aspect, the set of instructions might comprise instructions to perform operations in accordance with methods provided by various embodiments. Merely by way of example, the set of instructions might comprise instructions for detecting presence of a user, based on presence information, instructions for identifying the user, based on the presence information, and/or instructions for delivering information to the user, based on the detected presence of the identified user. In particular embodiments, the system might further comprise a user device, such as a presence detection device or a video communication device (as described in the '182 patent) that collects the presence information (to name a few examples). In other embodiments, the user device might comprise the computer.

A user device provided by other embodiments might comprise an image sensor to capture an image, a communication system, one or more processors and/or a computer readable medium in communication with the one or more processors. In an aspect, the computer readable medium might have encoded thereon a set of instructions executable by the computer system to perform one or more operations. In one embodiment, the set of instructions might comprise instructions to collect presence information in response to a request from a server computer over a network and instructions to transmit the presence information to the server computer. In another embodiment, the set of instructions might comprise instructions to receive, from the server computer, content owned by the user, in response to the transmitted presence information, even if the user device is not owned by the user. The content, for example, might be obtained by the server computer from another device that is owned by the user or from another source of content that the user has access to.

An apparatus in accordance with another set of embodiments might comprise a computer readable medium having encoded thereon a set of instructions executable by one or more computers to perform one or more operations, including without limitation operations in accordance with methods provided by various embodiments. Merely by way of example, the set of instructions might comprise instructions for detecting presence of a user, based on presence information, instructions for identifying the user, based on the presence information, and/or instructions for delivering information to the user, based on the detected presence of the identified user.

According to some aspects, a method might comprise collecting presence information, about a user, with a presence detection device. In some instances, the presence detection device might comprise a video input interface to receive video input from a local content source, an audio input interface to receive audio input from the local content source, a video output interface to provide video output to a video display device, an audio output interface to provide audio output to an audio receiver, a video capture device to capture at least one of image or video data, an audio capture device to capture audio data, a network interface, at least one processor, and a storage medium in communication with the at least one processor. The method might further comprise detecting presence of the user, with the at least one processor, based on at least one of an image or a video segment captured by the video capture device, an audio sample captured by the audio capture device, or presence of a user device in proximity to the presence detection device detected by the network interface. In some cases, the method might comprise identifying the user, with one or more of the at least one processor or a control server in communication with the network interface, based on the presence information, and delivering information to the user, with one or more of the at least one processor or the control server, based on the detected presence of the identified user.

According to some embodiments, delivering the information to the user might comprise obtaining the information from one or more of a location in a cloud computing system or a second presence detection device remote from the presence detection device. In some cases where the information is obtained from the second presence detection device remote from the presence detection device, the presence detection device might be at least one of a user device owned by the user or a user device associated with the user. In other cases where the information is obtained from the second presence detection device remote from the presence detection device, the presence detection device user device might be neither owned by nor associated with the user.

In some instances, the method might further comprise detecting, with the presence detection device, that the user is no longer present. In some embodiments where delivering information to the user might comprise transmitting the information to the presence detection device, the method might further comprise removing the information from the presence detection device, based on a determination that the user is no longer present.

The information, in some embodiments, might comprise at least one of video content, audio content, video game content, image content, or a software application. In some cases, each of the at least one of video content, audio content, video game content, image content, or the software application is one of purchased content, rented content, freely downloaded content, or user-generated content. In some instances, the information might comprise a user profile, which might comprise one or more of user profile information for a video game or video game console, user profile information for video or audio content, user profile information for each of one or more cloud services, or user profile information for device preferences. Delivering the information might comprise logging into a service with a credential of the user from the presence detection device. The service, according to some embodiments, might be a video calling service.

According to some embodiments, collecting presence information might comprise collecting presence information automatically, without user interaction. In alternative embodiments, collecting presence information might utilize user interaction. In some instances, identifying the user might comprise authenticating the user, which in some cases might permit delivery of the information.

Detecting presence of a user, in some instances, might comprise one or more of: analyzing a captured image or video segment, using facial recognition software, comparing the captured audio sample with a voiceprint, comparing the captured audio sample with stored challenge/response information, or determining whether the user device that is detected in proximity to the presence detection device is at least one of owned by the user or associated with the user. In some cases, one or more of these detection processes might be performed by the at least one processor of the presence detection device. In other cases, one or more of these detection processes might be performed by a server computer in communication with the presence detection device over a network. In some instances, detecting presence of the user device might comprise at least one of detecting a Bluetooth connection of the user device, detecting that the user device is associated with a WiFi access point with which the presence detection device has associated, or communicating with the user device using near field communication ("NFC").

The presence detection device might be a video game console, according to some embodiments. In some cases, the presence detection device might be a user device selected from a group consisting of a laptop computer, a desktop computer, a mobile phone, a smart phone, a tablet computer, a personal computer, and a video communication device (as described in the '82 patent).

According to some aspects, a presence detection device might comprise a video input interface to receive video input from a local content source, an audio input interface to receive audio input from the local content source, a video output interface to provide video output to a video display device, an audio output interface to provide audio output to an audio receiver, a video capture device to capture at least one of image or video data, an audio capture device to capture audio data, a network interface, at least one processor, and/or a storage medium in communication with the at least one processor. The network interface might be configured to communicate with at least one of an access point, a computer over a network, a second presence detection device over the network, or a user device in proximity to the presence detection device. The storage medium might have encoded thereon a set of instructions executable by the at least one processor to control operation of the presence detection device.

The set of instructions might comprise instructions to detect presence of a user, based on at least one of an image or a video segment captured by the video capture device, an audio sample captured by the audio capture device, or presence of a user device in proximity to the presence detection device detected by the network interface. The set of instructions might further comprise instructions to identify the user, based on the presence information, and instructions to deliver information to the user, based on the detected presence of the identified user.

In some aspects, a system might comprise a computer and one or more presence detection devices. The computer might comprise at least one first processor and a first storage medium in communication with the at least one first processor, the first storage medium having encoded thereon a first set of instructions executable by the at least one first processor to control operation of the one or more presence detection devices. Each of the one or more presence detection devices might comprise a video input interface to receive video input from a local content source, an audio input interface to receive audio input from the local content source, a video output interface to provide video output to a video display device, an audio output interface to provide audio output to an audio receiver, a video capture device to capture at least one of image or video data, an audio capture device to capture audio data, a network interface, at least one second processor, and a second storage medium in communication with the at least one second processor. Each network interface might be configured to communicate with at least one of an access point, the computer over a first network, another one of the one or more presence detection devices over a second network, or a user device in proximity to the presence detection device. Each of the second storage medium might have encoded thereon a second set of instructions executable by the at least one second processor to control operation of the presence detection device.

At least one of the first set of instructions or the second set of instructions might comprise instructions to detect presence of a user, based on at least one of an image or a video segment captured by the video capture device, an audio sample captured by the audio capture device, or presence of a user device in proximity to the presence detection device detected by the network interface. The at least one of the first set of instructions or the second set of instructions might further comprise instructions to identify the user, based on the presence information, and instructions to deliver information to the user, based on the detected presence of the identified user.

In some embodiments, the computer is a server computer that is remote from the presence detection device, and in communication with the presence detection device over the first network. In some cases, the computer might be embodied in at least one of the one or more presence detection devices. According to some embodiments, the first network and the second network might be the same network, while in other embodiments, the first network and the second network might be separate networks.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
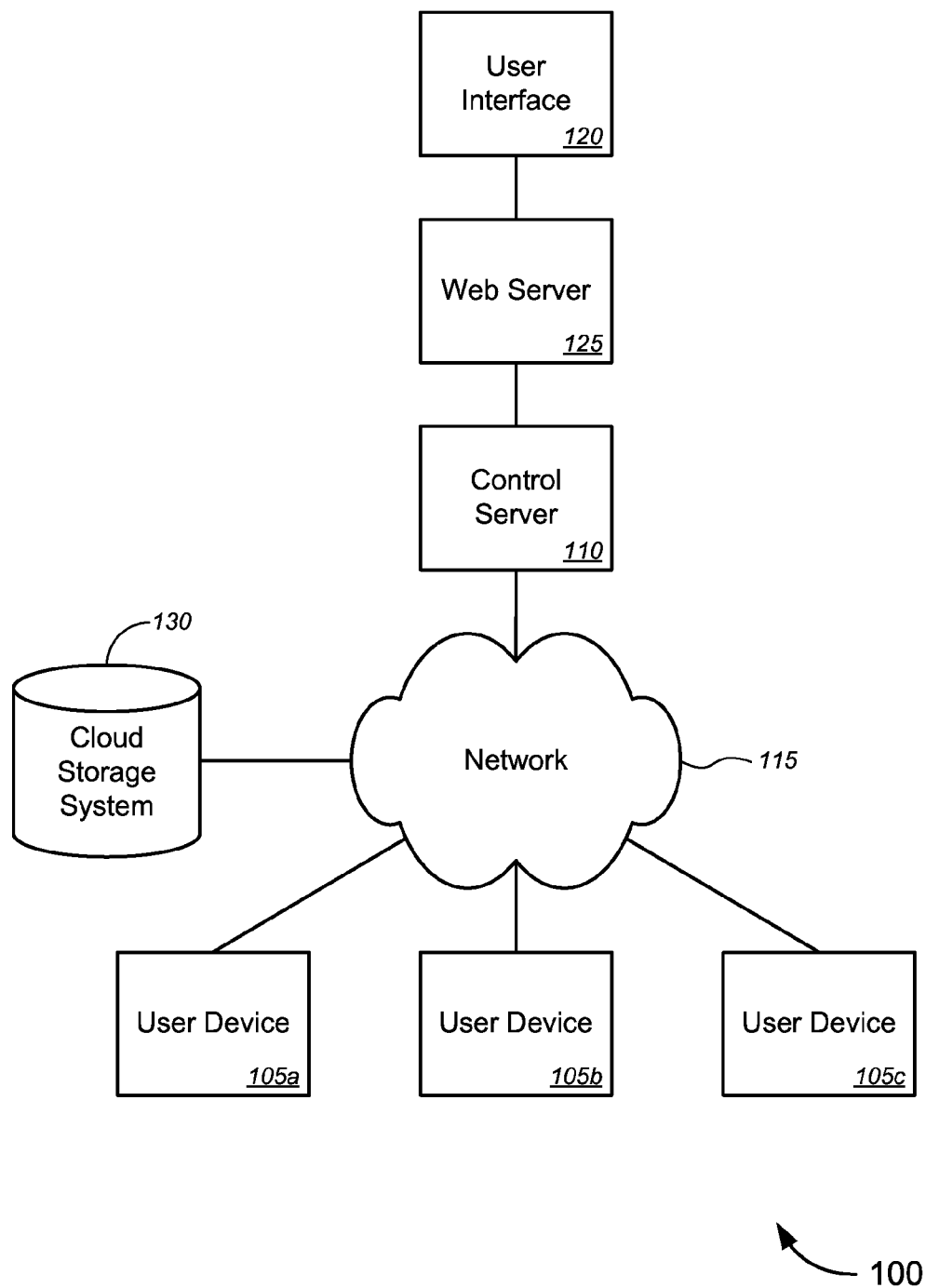
FIG. 1 is a block diagram illustrating a system for delivering content based on the presence of a user, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Features Provided by Various Embodiments

Presence Detection Devices ("PDDs") provided by various embodiments can contain or communicate with, inter alia, cameras, microphones, and/or other sensors (including, without limitation, infrared ("IR") sensors). These sensors, in conjunction with the internal processing capability of the device, can allow the device to detect when a person is in the room. Additionally, through means such as facial recognition and voice detection, or the like, the devices also can automatically recognize who is in the room. More specifically, such devices can detect the presence of a particular individual.

In various embodiments, presence detection can be local and/or cloud based. In the case of local presence detection, the device itself might keep a list of all user profiles and will attempt to match an individual against its local list of all users. In cloud based detection, the functionality of user detection can be moved into servers in the cloud. A cloud based approach allows detection of a user's presence to be mobile among various devices (whether owned by, and/or associated with, the user or not). That same user can be detected on their device or on any other device that has the same capability and that is tied into the same cloud infrastructure.

The ability to automatically detect the presence of an individual on any device presents a powerful new paradigm for many applications including automation, customization, content delivery, gaming, video calling, and others. Advantageously, in some embodiments, a user's content, services, games, profiles, and/or preferences, etc. can follow that user from device to device, including devices that are not owned by (or previously associated with) the individual.

Various sensors on a PDD can be used for user detection. Facial recognition can be used to identify a particular individual's facial characteristics, and/or voice detection can be used to uniquely identify a person. Additionally, PDDs may also have local data storage. This local data storage can be used to store a database of user profiles. The user profiles can contain the various mechanisms that can be used to identify a person, including username and password, facial characteristics, voice characteristics, etc. When sensors detect the facial features or capture the voice of a particular individual, that captured presence information can be compared against the characteristics of the users on the local storage. If a match is found, then the individual has been successfully identified by the device. (As used herein, the term "presence information" can be any data or information that can be used to determine the presence of a user, and/or to identify and/or authenticate such a user. As such, presence information can include raw image, video, or audio data, analyzed data (e.g., video or image data to which preliminary facial recognition procedures, such as feature extraction, have been employed, as well as verification of audio self-identification or verification of audio challenge/response information), the results of such analysis, and even the end result of the detection process—i.e., a notification that a user is present and/or an identification of the user.)

Detection of a user's presence can also be detected via proximity of a PDD to another device. For example, if a user's mobile phone, tablet, or PC is near the PDD, that person is automatically detected. In some instances, a unique device identifier for each of a user's device might have previously been associated with the user's profile in a cloud database or the like (i.e., making the user's devices "known devices"), and detection of such unique device identifiers might serve as a basis for identifying the user, or might streamline the identification process by verifying whether the person with the device owned by or associated with the known device is the user or simply someone in possession of the device(s) (whether lawful or unlawful). Such verification might comprise one or more of facial recognition, voice recognition, audio challenge/response verification, biometric analysis, or the like. In some cases, audio challenge/response verification might include analysis of sub-vocal responses from the person challenged, to prevent undesired casual overhearing of audio passwords, audio keyphrases, or the like. In some instances, biometric analysis might include analysis of any suitable biometric (aside from facial and voice recognition) selected from a group consisting of fingerprint, iris, pupil, height, unique scar(s), other unique physical characteristics, and/or any combination of these biometrics. To capture biometric information such as fingerprints, iris, pupil, height, scar, or other unique physical characteristics, which might be image-based biometrics (which might be captured by a high resolution video capture device of the PDD), the PDD might prompt the person being identified to position himself or herself so that his or her fingerprints, iris, pupil, full body, scar, or other unique physical characteristics, respectively, are appropriately facing the video capture device of the PDD.

In some embodiments, with detection of known devices and with automatic detection/identification processes being enabled, it may be possible for the system to identify persons not normally associated with a known device being in possession of the known device. In such a case, the system might notify the original user (via e-mail or other forms of communication indicated in the user's profile, or the like) of the situation. In some instances, the user might indicate that the unknown person does have authority or permission to use, or be in possession of, the user's device. In other cases, where the user indicates that the user does not have authority or permission to use the device, the user may be given options to proceed, including, without limitation, options to lock data, options to lock device functions, options to activate location tracking (including, without limitation, global positioning system ("GPS"), global navigation satellite system ("GNSS"), etc.) of the device (in case the system loses track of the device; e.g., in the case the device moves outside the range of the system's sensor/detection/communications systems), options to contact the unknown person, options to activate speakers to emit sirens, options to activate displays or lights (e.g., light emitting diodes ("LEDs"), organic LEDs ("OLEDs"), liquid crystal displays ("LCDs"), etc.), and/or options to notify authorities (e.g., police or other law enforcement personnel) of the situation and/or the location of the device (e.g., GPS coordinates, or the like), etc.

Additionally and/or alternatively, proximity detection can be done using GNSS location tracking functionality, which can be found in many electronic devices and authenticating the user when the secondary device is within a predefined distance of the PDD. Proximity detection can also be done wirelessly via Bluetooth or WiFi. With respect to Bluetooth, if the secondary device pairs with the PDD, the user can be considered detected. With respect to WiFi, one approach could be to see if the secondary device associates with the same WiFi access point that the PDD is connected to. Another approach to proximity detection is the use of near-field communications ("NFC") commonly found in many electronic devices. When the secondary device is within range of the PDD, a NFC detector can be used to determine that the user is in the room. From these examples, a skilled reader should appreciate that many different techniques can be used to detect presence based on device proximity.

In some embodiments, detection of an individual can be fully automatic and might require no user interaction. For example, the system can characterize an individual's facial features (and/or unique physical characteristics or other biometrics) automatically, detect the presence of a secondary device, characterize an individual's voice print automatically, etc. Several detection methods can be used in combination to reduce errors in the detection process. For example, if the system detects a person in the room and first identifies that person's facial features, it can then prompt them for voice (e.g., "Bob is that you?"). Once the user's voice is captured, that audio sample can be compared against the stored voice characteristics for that user, to reduce false detection. Another approach for the second step may be to prompt the user to speak a PIN or password to be compared against what is stored in the user profile. Using this approach, the characteristics of the speech (e.g., user's voice, cadence, syntax, diction) and the content of the speech (e.g., a PIN or password) can be jointly used to reduce false detections. To prevent eavesdropping of passwords or PINs, the audio capture device might be configured to capture subvocalizations of the passwords or PINs, for analysis. Alternatively and/or additionally, the system can prompt the user to position his or her body so as to allow the video capture device to face one or more of the user's fingers (e.g., for fingerprint analysis), the user's eyes (e.g., for iris and/or pupil analysis), the user's full body (e.g., for height analysis), portions of the user's body (e.g., for analysis of scars or other unique physical characteristics, or the like), etc.

In some embodiments, physical geography can be used as a metric in detection to reduce the possibility of errors. For example, if a user is known to use the system in Dallas, Tex., and then is detected in Madrid, Spain, the system can weigh detection in Spain lower than detection in Dallas. Additionally, if the user is detected in Spain, a secondary authentication method may optionally be invoked to reduce false detection. According to some embodiments, in the case that the system has access to profile or other personal information of the user such as communications, calendar items, contacts list, travel/itinerary information, or the like that might indicate that the user might be visiting a friend or relative in Spain having a similar PDD linked to a common network or cloud server, the system might determine that the user is or will be in Spain. In such a case, the user's profiles, media content, or the like (or access thereto) might be sent to the friend's or relative's device in Spain or to a local data center or the like to allow the user to access content or profiles on the friend's or relative's device during the visit. After the scheduled visit, it may be determined using any combination of the user's personal information, the user's devices (including the user's PDD, mobile devices, etc.), and/or the friend's or relative's device whether the user has left the friend's or relative's location (in this example, Spain). If so determined, the content and profiles (or access thereto, as the case may be) might be removed from the friend's or relative's device (and/or from the data center or the like that is local to said device).

In particular embodiments, a PDD can also be connected to a network, such as the Internet. In such a scenario, the database of user profiles, including identifiable facial and/or voice characteristics, as well as other identifying information (e.g., passwords, identifying information for other devices owned by the user, etc.), can be stored on servers located in the cloud, i.e., on the network or in a distributed computing system available over the network. In some cases, the distributed computing system might comprise a plurality of PDDs in communication with each other either directly or indirectly over the network. The distributed computing system, in some instances, might comprise one or more central cloud servers linking the plurality of PDDs and controlling the distribution and redundant storage of media content, access to content, user profiles, user data, and/or the like. When an individual's facial features are detected by a PDD, those features (and/or an image captured by the PDD) can be sent to a server on the network. The server then can compare the identifiable facial features against the database of user profiles. If a match is found, then the server might inform the device of the identity of the user and/or might send a user profile for the user to the device.

In some embodiments, user profiles, including facial characteristics, can be stored both locally on the device and on a server located in the cloud. When using both device-based and cloud-based databases, user identification can be performed by first checking the local database to see if there is a match, and if there is no local match, then checking the cloud-based database. The advantage of this approach is that it is faster for user identification in the case where the user profile is contained in the local database. In some embodiments, the database on the device can be configured to stay synchronized with the database in the cloud. For example, if a change is made to a user profile on the device, that change can be sent to the server and reflected on the database in the cloud. Similarly, if a change is made to the user profile in the cloud-based database, that change can be reflected on the device database.

Matching presence information or identifying information with an individual having a user profile can be a form of authentication in some embodiments. User profiles can also contain information necessary for many authentication mechanisms. Such information may include challenge/response pairs (such as username and password combinations, security question/pass phrase combinations, or the like), facial recognition profiles, voice recognition profiles, and/or other biometric information, such as fingerprints, etc. An individual may be authenticated using any combination of such techniques.

In some cases, the system can also determine when a user is no longer present. Merely by way of example, a PDD might continually (or periodically) monitor for the user's presence. For instance, in the case of facial recognition, the device can continually check to detect whether a captured image includes the user's face. With voice recognition, after a period of inactivity, the device might prompt the user if he or she is there (e.g., "Bob, are you still there?").

According to some embodiments, user profiles can work across heterogeneous networks. Not all user devices need to be the same. Some user devices might be PDDs. Other user devices might be VCDs, computers, tablets, mobile phones, etc. Each can use any appropriate method (based on device capabilities) to determine the presence of, identify, and/or authenticate the user of the device with a user profile.

In an aspect, this automated presence detection can be used to provide user information (e.g., content or services) to an identified user. For instance, users often purchase content such as movies, music, media, video games, and/or video calling services, or the like. These purchases often need to be protected so that only authorized users can have access. Associating content with a user profile allows the content purchaser to access his or her purchases whenever the user has been authenticated. With a PDD, when a user enters the room, and the camera sensors detect that user's facial features and authenticates the individual, the content associated with that user profile can automatically become available to that individual. Additionally, with the cloud-based authentication approach described herein, that user's content and/or profiles can become available on any device. More specifically, if a user is identified by another PDD, then his or her content becomes available to him or her even if the PDD that he or she is in front of is not the user's own device. This functionality allows a new paradigm in which the user's content and/or profiles follow the user automatically. Similarly, when upgrading PDDs, detection, identification, and authentication of the user on the new device can allow automatic and easy porting of the user's content and/or profiles to the new device, allowing for an ultimate type of "plug-and-play" functionality, especially if the profiles include information on configurations and settings of the user devices (and interconnections with other devices).

When a user purchases content, it is often the case that the content is served to a user's device from servers in the cloud. Traditionally, this is accomplished by logging into a server or website with a username and password, and then having access to your content, which can be anything including movies, music, photos, games, etc. In this model, once authenticated, the content is served from a server in the cloud to the device the user is using, without the need for the user to login to the server (e.g., by entering a username and password). PDDs can provide access to a user's own online content automatically when in front of any PDD, whether the user's own device or someone else's. Movies, music, and other media content that a user has purchased to view can be automatically made available to the user when the user is in front of his or her own PDD or if the user is in front of someone else's PDD. Online games that a user has purchased are automatically made available to the user to play when in front of his or her own device or console as well as another user's device or console. Further, user profiles for games and the like, online identities, saved game statuses or states, and other personal information can be downloaded to whatever device or console at which that user happens to be present. In some cases, interoperability amongst the various devices (e.g., amongst the PDD and the user's other devices) might allow for media content related to the purchased media content (e.g., movie, television program, music, game, etc.) to be displayed on one or more of the user's other devices while the said purchased media content is being presented through the PDD (and in some cases, to a display device and/or audio sound system, or the like).

Content is often rented as well. While this model can be used with any type of content (e.g., music or music videos, etc.), the content renting model is typically applied to movies, television programs (usually serial compilations, such as the latest or previous season(s) of a particular television program), and games. When content is rented, it is made available to a user when that user authenticates with the renting service. With PDDs, when a user is in front of any PDD (whether owned by/associated with the user or owned by/associated with someone else), all of that user's rented content becomes instantly available wherever he or she may be. For example, if a user rented a movie at home, it would automatically be available for the user to watch at a friend's home if that friend owned a PDD that automatically authenticated the user to the user's content and/or profiles. Similarly, such authentication techniques can allow a user to rent (or purchase) content from any device at which the user is present, without having to link that content to an owner of the device; instead, the rented or purchased content can be linked to the present user (and will be available to that user on other devices, including the user's own devices and devices not owned or associated with the user). An analogy might be the user renting a DVD or Blu-ray movie (or music CD), and bringing the rented media content recording medium to a friend's home to present the rented media content, except without either the physical recording medium or physical interaction with the friend's device to gain access to the rented media content (except only to select which one to present through the friend's device and when). Rather, the device at the location at which the user is currently present detects, identifies, and authenticates the user thereby allowing the user's profiles and/or content (including rented media content) to follow the user to that location. The user can also purchase or rent media content while at the friend's home (using the friend's device), perhaps based on recommendations by the friend, and the purchased or rented media content can be associated with the user's profile. When the user returns home, the purchased or rented media content may be made available to the user, through the user's profile, upon the user being detected and recognized (and authenticated) by the user's device.

In many cases, purchased content is downloaded directly to a particular device. For example, this could include movies, television shows, music, photos, software applications, and/or games. In such a scenario, the content is served by the device that has downloaded the content and from a server in the cloud. Merely by way of example, movies might be played locally (rather than streamed from an online server) and games can be played locally (rather than online). When a user is in front of his or her own PDD, that user's own content is automatically made available on the device. The content is served locally, since it has been downloaded to the local device. When a user is authenticated by a PDD that is not his or her own, content that the user has purchased and downloaded on the user's own device is not stored on the device the user is currently using. However, using the features of embodiments described herein, a user's downloaded content can be automatically made available to the user. The new PDD that the user is using can automatically download the content that the user requests to use. For example, suppose a user has purchased a movie or game that the user will use with his or her PDD at home. That movie or game is associated with that user's profile. If that user is in front of another PDD and automatically becomes authenticated, then the content associated with that user's profile can be made available to the new PDD. The new PDD can download the game or movie as the user tries to access it on the new device. In this manner, the user can watch his or her movies or play his or her games on any PDD. Additionally, if the content already exists on the new device (i.e., the owner of the new device also has the same content on it), then the user can be granted access without initiating a download.

In some cases, content is rented and downloaded directly onto a particular device. The content itself is time sensitive and cannot be used after a certain period of time. A user's profile can also indicate any content that has been rented. When a user is in front of any PDD, the content can automatically download the rented content when accessed and be made available to the user on the new PDD.

PDDs also are capable of handling user-generated content, which can include, but is not limited to, home movies, DVR content, movies, songs, pictures, and others. User-generated content is not generally stored on servers in the cloud, but rather is stored locally on a particular user device. When accessing user generated content from another device, the PDD that has the user generated content stored locally needs to serve the content to the new device that the content owner is using. In order to do this, the new PDD might need to get a list of user generated content that is stored on the content owner's device. This can, in some embodiments, be facilitated via a server that is in the cloud that all PDDs are always or mostly connected to. The server can communicate with all PDDs and help send messages between PDDs. When a user is authenticated with a new PDD, the new device can request the content list from the content owner's device. If the content owner requests content from the new device, then the owner's PDD (or other user device) can serve the content to the new device. This can be done either directly in a peer-to-peer fashion or can be facilitated by the server. In some embodiments, this communication can be accomplished by using protocols such as XMPP, SIP, TCP/IP, RTP, UDP, etc.

Exemplary Embodiments

FIGS. 1-5 illustrate exemplary embodiments that can provide some or all of the features described above. The methods, systems, and apparatuses illustrated by FIGS. 1-5 may refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 illustrates a functional diagram of a system 100 for controlling, and/or providing communication between, one or more user devices, which can include but are not limited to presence detection devices ("PDDs"), (which are labeled user devices 105 in FIG. 1 but described herein as PDDs when referring to PDD functionality). The skilled reader should note that the arrangement of the components illustrated in FIG. 1 is functional in nature, and that various embodiments can employ a variety of different structural architectures. Merely by way of example, one exemplary, generalized architecture for the system 100 is described below with respect to FIG. 5, but any number of suitable hardware arrangements can be employed in accordance with different embodiments.

A PDD 105 can be any device that is capable of communicating with a control server 110 over a network 115 and can provide any of a variety of types of video communication, content delivery, gaming, and/or presence detection functionality Merely by way of example, in some aspects, a PDD 105 can be capable of providing pass through video/audio to a display device (and/or audio playback device) from another source (such as a set-top box), and/or overlaying such video/audio with additional content generated or received by the PDD 105. In other aspects, a PDD 105 can comprise one or more sensors (e.g., digital still cameras, video cameras, webcams, security cameras, microphones, infrared sensors, touch sensors, and/or the like), and/or can be capable, using data acquired by such sensors, of sensing the presence of a user, identifying a user, and/or receiving user input from a user; further, a PDD 105 can be capable of performing some or all of the other functions described herein and/or in the Related Applications. Hence, in various embodiments, a PDD 105 can be embodied by a video calling device, such as any of the VCDs described in the '182 patent, a laptop computer, a desktop computer, a mobile phone, a smart phone, a tablet computer, a video game console, and/or a streaming media player, to name a few non-limiting examples.

In one aspect of certain embodiments, as described more fully with respect to FIG. 3 below, a PDD 105 can be placed functionally inline between a local content source and a display device. A local content source can be any device that provides an audio or video stream to a display device and thus can include, without limitation, a cable or satellite set-top box ("STB"), an Internet Protocol television ("IPTV") STB, devices that generate video and/or audio, and/or acquire video and/or audio from other sources, such as the Internet, and provide that video/audio to a display device; hence a local content source can include devices such as a video game console, a Roku® streaming media player, an AppleTV®, and/or the like. When situated functionally inline between a local content source and a display device, the PDD can receive an audiovisual stream output from the local content source, modify that audiovisual stream in accordance with the methods described herein, and provide the (perhaps modified) audiovisual stream as input to the display device. It should be noted, however, that, in some cases, the functionality of a local content source can be incorporated within a PDD, and/or the functionality of a PDD can be incorporated within a local content source; further, it should be appreciated that a PDD (which might or might not include local content source functionality) can be disposed inline with one or more other local content sources or one or more other PDDs. Hence, for example, a PDD with some local content source functionality (such as a video game console) might be disposed inline between one or more other PDDs or one or more other local content sources (such as a cable STB, satellite STB, IPTV STB, and/or a streaming media player) and a display device.

In an aspect of some embodiments, the system 100 can include a software client that can be installed on a computing device (e.g., a laptop computer, wireless phone, tablet computer, etc.) that has a built-in camera and/or has a camera attached (e.g., a USB webcam). This client can act as an interface to allow remote control of the built-in and/or attached camera on the computing device. In some embodiments, the computing device might have a built-in microphone(s) and/or has a microphone(s) attached (e.g., a tabletop microphone, a wall-mounted microphone, and/or a microphone removably mountable on a television, on the PDD, and/or on some other suitable user device, or the like). The software client can alternatively and/or additionally act as an interface to allow remote control of the built-in and/or attached microphone on the computing device. In some cases, the camera and/or microphone can be automatically or autonomously controlled to obtain optimal video and/or audio input.

The system 100 can further include a control server 110, which can have any suitable hardware configuration, and an example of one such configuration is described below in relation to FIG. 3. In one aspect, the control server 110 is a computer that is capable of receiving user input via a user interface 120 and/or performing operations for controlling the PDD(s) 105, for example as described in further detail below. As used with regard to the relationship between the control server 110 and a PDD 105, the term "control" should be interpreted broadly to include any operations that operate, configure, or directly control the PDD 105, as well as operations that facilitate communication between the PDD 105 and other devices, networks, content sources, and the like, and/or operations that provide processing support to a PDD 105. Merely by way of example, however, the control server 110 can detect user presence, identify/authenticate users, and/or obtain and distribute content to present users. In other cases, the control server can receive and/or store user input and/or user preferences that can specify whether and how presence information should be used, whether and how the user's content and profiles should be handled under certain situations, and/or the like. For example, preferences might specify which content or other information should be delivered to a user when present at a device not owned by the user, whether presence information should be collected for that user at all (and/or where such information should be collected); for example, a user might specify that his presence should only be monitored in selected locations or from selected devices, and the control server 110 might remove that user's profile from the search universe when provided with presence information from a device not at the selected location or from a device other than one of the selected devices. More generally, the user preference can include any types of parameters related to collecting presence information, using presence information, and/or serving content. These preferences might be stored in a user profile at the control server 110, which might also include other user-specific information, such as the user's normal location(s), identifying information (such as MAC address, etc.) of other user devices owned by or associated with the user, lists of or links to content owned by the user, and/or the like.

As such, the control server 110 can provide a user interface (which can be used by users of the PDDs 105, advertisers, and/or the like). The control server 110 might also provide machine-to-machine interfaces, such as application programming interfaces ("APIs"), data exchange protocols, and the like, which can allow for automated communications with the PDDs 105, etc. In one aspect, the control server 110 might be in communication with a web server 125 and/or might incorporate the web server 125, which can provide the user interface, e.g., over the network to a user computer (not shown in FIG. 1) and/or a machine-to-machine interface. In another aspect, the control server 110 might provide such interfaces directly without need for a web server 125. Under either configuration, the control server 110 provides the user interface 120, as that phrase is used in this document. In some cases, some or all of the functionality of the control server 110 might be implemented by the PDD 105 itself.

In an aspect, the user interface 120 allows users to interact with the control server 110, and by extension, the PDDs 105. A variety of user interfaces may be provided in accordance with various embodiments, including without limitation graphical user interfaces that display, for a user, display fields on display screens for providing information to the user and/or receiving user input from a user.

Merely by way of example, in some embodiments, the control server 110 may be configured to communicate with a user computer (not shown in FIG. 1) via a dedicated application running on the user computer; in this situation, the user interface 120 might be displayed by the user computer based on data and/or instructions provided by the control server 110. In this situation, providing the user interface might comprise providing instructions and/or data to cause the user computer to display the user interface. In other embodiments, the user interface may be provided from a web site, e.g., by providing a set of one or more web pages, which might be displayed in a web browser running on the user computer and/or might be served by the web server 125. As noted above, in various embodiments, the control system 110 might comprise the web server and/or be in communication with the web server 125, such that the control server 110 provides data to the web server 125 to be incorporated in web pages served by the web server 125 for reception and/or display by a browser at the user computer.

Figure 5:
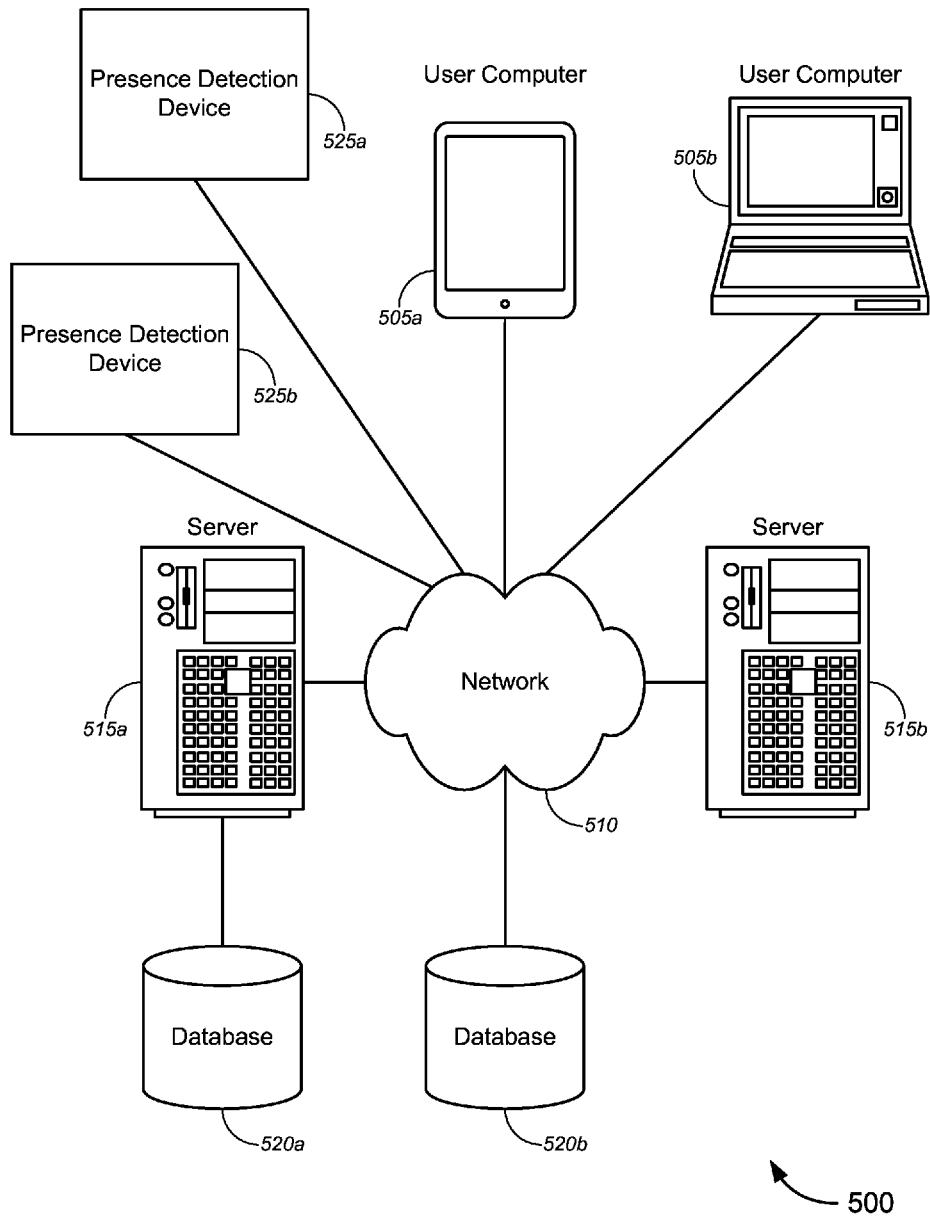
FIG. 5 is a block diagram illustrating a networked system of computers, which can be used in accordance with various embodiments.

The network 115, specific examples of which are described below with regard to FIG. 5, can be any network, wired or wireless, that is capable of providing communication between the control server 110 and the PDDs 105, and/or of providing communication between the control server 110 (and/or the web server 125) and a user computer. In a specific embodiment, the network 115 can comprise the Internet, any television distribution network, and/or any Internet service provider ("ISP") access networks that provide Internet access to the control server 110, the user computer, and/or the PDDs 105.

In some embodiments, the system 100 can include a cloud storage system 130, which can be used, as described in further detail below, to store advertisements, presence information, images, and/or video that are captured and uploaded by the PDDs 105, and/or the like. In some cases, the cloud storage system 130 might be a proprietary system operated by an operator of the control server 110. In other cases, the cloud storage system 130 might be operated by a third party provider, such as one of the many providers of commercially available cloud services. In yet a further embodiment, the cloud storage system 130 might be implemented by using resources (compute, memory, storage network, etc.) shared by a plurality of PDDs distributed among various users of the system. Merely by way of example, as described in further detail in the Distributed Infrastructure Application (already incorporated by reference herein), a plurality of user PDDs might each have some dedicated resources (such as a storage partition), which are dedicated for use by the system, and/or some ad hoc resources (such as network bandwidth, memory, compute resources, etc.) that are available to the system when not in use by a user. Such resources can be used as cloud storage and/or can be used to provide a distributed, cloud-like platform on which a control server can run as a virtual machine, cloud container, and/or the like.

Figure 2:
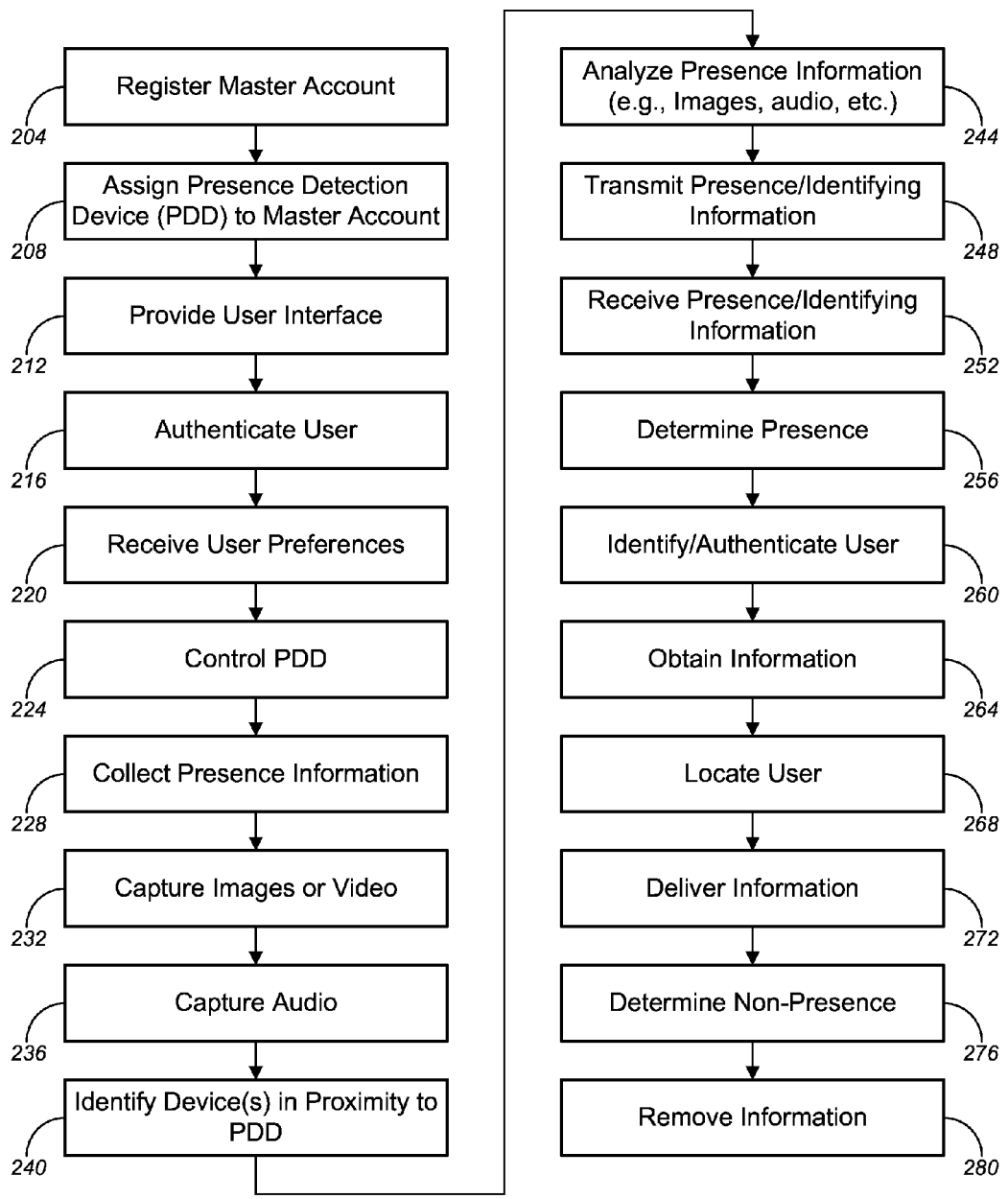
FIG. 2 is a process flow diagram illustrating a method of delivering content based on the presence of a user, in accordance with various embodiments.

FIG. 2 illustrates a method 200 of collecting and using presence information, in accordance with one set of embodiments. While the techniques and procedures are depicted and/or described in a certain order for purposes of illustration, it should be appreciated that certain procedures may be reordered and/or omitted within the scope of various embodiments. Moreover, while the method illustrated by FIG. 2 can be implemented by (and, in some cases, are described below with respect to) the system 100 of FIG. 1 (or components thereof), such methods may also be implemented using any suitable hardware implementation. Similarly, while the system 100 of FIG. 1 (and/or components thereof) can operate according to the method illustrated by FIG. 2 (e.g., by executing instructions embodied on a computer readable medium), the system 100 can also operate according to other modes of operation and/or perform other suitable procedures.

Turning to FIG. 2, the method 200 might comprise registering a master account for a user (block 204). In accordance with various embodiments, registering a master account for a user can comprise a variety of operations. Merely by way of example, registering a master account can comprise creating a database entry for a particular user and/or assigning authentication credentials to that user; these credentials can be used to access the master account, as described in further detail below.

The method 200 can also include assigning one or more presence detection devices ("PDDs") to the master account (block 208). As discussed above, the one or more PDDs can be embodied by a video calling device, such as any of the VCDs described in the '182 patent, a laptop computer, a desktop computer, a mobile phone, a smart phone, a tablet computer, a video game console, and/or a streaming media player, to name a few non-limiting examples. For instance, the user might identify any PDDs that the user owns (or is otherwise associated with; e.g., members of the user's family might be associated with the devices owned by the user), and the system can assign those PDDs to the user's master account. According to some embodiments, the user's master account might include any suitable number of sub-accounts. In one example, each member of the user's family might be associated with a sub-account linked with the master account. In some instances, the user (or some members of his or her family) might have a work/school sub-account and a home sub-account, the former being associated with profiles and/or media content appropriate for school or work, while the latter being associated with all, or all other, profiles and/or media content. In some embodiments, the master account and the plurality of sub-accounts might be organized as a hierarchy, with the master account (being at the top of the hierarchical structure) having full access to profiles and media content of each sub-account, the sub-accounts at the next level having access to profiles and/or media content of only those sub-accounts that the master account has given access to, and the sub-accounts at lower levels having limited access to profiles and/or media content. For example, the user's master account might have access to all profiles and/or media content associated with the master account and the sub-accounts. The user can provide his or her spouse with a sub-account having the same access to profiles and/or media content, while providing limited access to profiles and/or media content to each of the user's children's sub-account(s). In some instances, the user and/or the user's spouse might impose limits on access to profiles and/or media content for each of their work sub-accounts.

In some cases, each PDD might have an identifier, such as a hardware identifier, IP address, nickname, and/or the like, by which the system can address the PDD, and assigning a PDD to the master account can comprise associating that identifier with the master account. When a PDD is assigned to a master account, the user of that account will be able to access, configure, and/or control the PDD through the control server, for example as described in further detail below. In some cases, the user might own a plurality of PDDs and might wish to control all of the PDDs from a single master account. In an aspect, a user can identify such devices through a user interface to the control server.

In another aspect, as described briefly above, the assignment process can be simplified. When the user first configures a PDD (usually locally, but perhaps over the network), the user can provide credentials to the PDD that associate the device with the master account. Thereafter, the PDD might be configured to communicate with the control server and identify itself using those credentials; at that point, the control server can assign the PDD to the master account, and no credentials need to be stored on the PDD from that point forward (other than perhaps the PDD's own identifying information).

Hence, the method 200, in the illustrated embodiment, might further comprise providing a user interface to allow interaction between the user and the control server (block 212). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving, and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic Hypertext Markup Language ("HTML") and/or Asynchronous JavaScript and XML (or extensible markup language) ("AJAX") technologies, to name but a few examples.

In many cases, providing a user interface will comprise providing one or more display screens each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to log on to a master account, access PDDs via the control server, etc.

In an aspect of some embodiments, the user logs onto his or her master account at the control server in order to access and/or control PDDs assigned to that account. Accordingly, at block 216, the method 200 can include authenticating the user with a set of credentials associated with the master account (e.g., with any of several known authentication schemes, such as a userid/password challenge, a certificate exchange process, and/or the like, as well as authentication techniques, described in further detail below, that employ sensors on a PDD, such as facial recognition, voiceprint analysis, gesture-based identification, spoken identifiers, and/or the like). Once the user has been authenticated, the user interface can present the user with a variety of different information, including without limitation information about status of PDDs assigned to the master account to which the user has logged on, options for controlling such PDDs, and/or the like.

Thus, in some aspects, the method 200 might further comprise receiving (e.g., via a network, such as the Internet, to name one example) user preferences (block 220), and in particular user preferences relating to the collection and/or use of presence information, including without limitation preferences such as those described above. The method 200, then, can further include controlling and/or configuring the PDD, in some cases based at least in part on the user preferences (block 224). Merely by way of example, the user might have specified in the user preferences that the PDD should not be used to collect presence information at all, in which case that feature might be turned off at the PDD. In the case that the user preferences indicate that presence information should be turned off (e.g., privacy settings may be set high, either permanently or temporarily, and/or with respect to certain user-established and/or preset conditions, or the like), some embodiments might establish a blocking feature for the user when other PDDs send presence information for comparison matching processes with database user biometrics, the effect of which being that no match can be made, and thus the user's profiles and/or media content (and/or access thereto) is not ported to the other PDDs. Alternatively and/or additionally, the user might have specified some limitations on the collection of presence information (such as about whom such information may be collected, times at which information can be collected, and/or purposes for which information may be collected, to name a few examples). Of course, in some embodiments, these preferences can be set directly at the PDD, e.g., through a menu system displayed on a video device. It should also be recognized that some preferences (such as with whom presence information can be shared)

might not affect the PDD and might be saved and/or operated on at the control server instead.

The amount of control imposed by the control server can vary according to embodiment and implementation. Merely by way of example, as noted above, in some embodiments, there might be no control server, and the PDD might incorporate all the functionality described herein with regard to the control server, including peer-to-peer functionality with other PDDs. In other embodiments, the control server might provide fairly fine-grained control over the PDD, such as instructing the camera to capture images for purposes of determining presence, and/or the control server may receive the images directly and perform the presence determination, identification, and/or authentication procedures at the control server. The division of responsibility between the control server and the PDD can fall anywhere along this spectrum. In some cases, for instance, the control server might provide the user preferences to the PDD, which then is responsible for collecting presence information in accordance with those preferences and transmitting the presence information to the control server, which takes the appropriate action in response to the presence information, such as, selecting an advertisement based on the presence information. Alternatively and/or additionally, the PDD itself might be responsible for taking such actions.

At block 228, the method 200 can comprise collecting presence information. A variety of operations might be involved in the collection of presence information. For example, in some cases, the PDD captures one or more images of at least a portion of a room where it is located and/or of a user present in the room (block 232). Such images can be digital still images, a digital video stream, and/or the like. In other cases, the method can include capturing audio samples (block 236), identifying devices in proximity to the capturing device (block 240), and/or the like (for example as described above).

The method 200 can further comprise analyzing one or more of the collected presence information (block 244), including one or more of the images, video samples, audio samples, etc. Merely by way of example, the images and/or video samples might be analyzed with facial recognition software and/or other biometric/physiological recognition software, which can be used to determine the number of people in the room with the PDD and/or to identify any of such people (e.g., by determining a name, an age range, a gender, and/or other identifying or demographic information about a user, based on the output of the facial recognition software and/or other biometric/physiological recognition software). Alternatively and/or additionally, analyzing the images can comprise determining that a person is watching a display device, for example using eye-tracking software to identify a focus area of the person's eyes and correlating that focus area with the location on a screen or display of a television (or other suitable display device). In some cases, if the number of people and the identities (or at least demographic characteristics) of each of the people in the room can be determined, analyzing the images can further include determining a collective demographic of the people in the room (based, for example, on the demographic characteristics of a majority of people in the room). In further cases, the method might analyze audio samples using voiceprint analysis, compare user responses to stored challenge/response information, and/or the like. As yet another example, a camera of a PDD might capture user gestures, which can be compared with stored gestures (e.g., a particular pattern of hand waving, a pattern of fingers displayed by the user, etc.) in a gesture-based identification and/or authentication scheme. It should be noted that many embodiments can use various combinations of such techniques (such as a combination of facial analysis and spoken, gestured, or typed identifiers, to name a few examples) to provide two-factor authentication.

Such analysis can be performed at the PDD and/or at the control server. Accordingly, in some embodiments, the PDD will transmit presence information or other identifying information that can be used (in part or in whole) for identifying the user. Such identifying information can include raw or analyzed presence information, as well as information derived from the presence information, such as, to name some examples, extracted features from an image, audio segment, and/or video segment; an excerpted image, video, and/or audio segment; and/or the like. Such presence information and/or identifying information can be transmitted from the PDD to the control server (block 248), although as noted above, this is not necessary in some embodiments (e.g., where identifying the user or other analysis is performed at the PDD). Such transmission might comprise IP communications over the Internet, (perhaps over a secure channel, such as a virtual private network ("VPN")), and, as noted above, the presence/identifying information can include a wide variety of different types of information that enable the control server to determine presence and/or identify/authenticate a user. Hence, at block 252, the control server (in a cloud-based presence detection scheme) might receive the transmitted presence information. In the case that raw presence information is received by the control server, the control server might analyze the raw presence information in a similar manner as described above at block 244. At block 256, the method 200 comprises detecting and/or determining presence of a user. This determination can be made by the PDD and/or by the control server. In one case, for example, the PDD might transmit raw video segments, raw images, raw audio samples, etc. to the server, which might perform all analysis and presence determination. In another case, the PDD might perform this analysis and might notify the control server that a user is present. Receiving such a notification at the control server can be considered to be the control server detecting presence of a user.

At block 260, the method 200 can include identifying and/or authenticating a user. In some cases, this identification and/or authentication can be implicit in the operation of detecting user presence. For example, in performing facial recognition to detect that a user is present, the PDD (and/or control server) might further analyze the same image to determine an identity of the present user. Alternatively, however, detection of user presence and identification/authentication of the user might be performed as discrete steps (and might depend on device capabilities). For example, a PDD might have sufficient capabilities to detect the presence of the user, and if so, might send identifying information (such as a captured image, video sample, audio sample, etc.) to the control server to actually identify the user. Alternatively, the PDD might be capable of identifying the user on its own and might merely send the identity of the user (i.e., data identifying the user, such as a name, username, etc.) to the server.

In some instances, the PDD and/or the control server (i.e., in a cloud-based presence scheme) might have access to the user's profile or other personal information of the user (including, without limitation, communications, calendar items, contacts list, travel/itinerary information, IP address of user's PDD(s), or the like). Such profile or other personal information might indicate that the user is visiting a friend or relative in a different city, state, or country. In the case that the friend or family member has a similar PDD linked to a common network with the control server or other PDDs (i.e., in a peer-to-peer or distributed computing scheme), the user's PDD and/or the control server (if present) might facilitate identification and/or authentication of the user at the friend's or relative's PDD ("other PDD"), by, for example, sending the user's biometric/physiological information to the other PDD and/or to a data center local to the other PDD, so as to reduce comparison/matching times for identification/authentication of the user at the other PDD. In this manner, delivery of information (as described below at block 272) may be facilitated, to provide quicker access to the user's profiles and content at the other PDD. Such proactive autonomous facilitation functionality might, in some cases, be subject to the user's selection of such option in the user preferences (e.g., at block 220 above). In some cases, the user might disable and/or limit such functionality (e.g., for privacy reasons, for security reasons, and/or the like). In some embodiments, the IP address of a PDD at which a user attempts to log in might be analyzed to determine the city in which the PDD is located. If the city (or neighborhood or customer premises) of the last PDD at which the user logged in (or is otherwise authenticated by) is determined to be different from the city (or neighborhood or customer premises) of the current PDD, then it can be inferred that the user has moved, or is travelling. Such inference may be used, in some embodiments, to further infer a general direction in which the user is travelling (or to infer a potential destination(s), if sufficient numbers of data points/locations are determined), and can be used to send ahead the user's profile and/or content to control servers and/or PDDs that are at or near the determined potential destination(s).

Once the present user has been identified and/or authenticated, the control server (and/or the PDD at which the user is present) might obtain content or other information for the user (block 264). This content/information can include any such information noted above, such as video/audio content owned/rented/generated by the user, user profile information, and/or the like. In some cases, obtaining such content can comprise accessing the content on another PDD (or other user device) owned by and/or associated with the user, and/or on another PDD (or other user device) owned by and/or associated with someone other than the user. In some cases, the content/information might be stored on the control server and/or elsewhere in the cloud, in which case the server might obtain the content from such a location or might not need to obtain the content at all.

At block 268, the method can include determining a location of a user. Such a location might be an absolute physical location, and/or the location might be a location relative to a particular PDD. Merely by way of example, determining the location of the user might include determining that the user is located at a particular address, in any particular state or country, and/or the like; alternatively, determining the location might comprise determining that the user is present at a PDD known to the system. Hence, such a determination might be explicit, e.g., using location services of a device at the user's location (such as the application device at which the user is present), or the determination might be implicit (e.g., determining implicitly that the user is proximate the PDD used to determine that the user is present) and need not be a discrete operation. In any case, the system can use the location of the user to determine where content should be delivered (e.g., to a particular user device at the user's location, to the PDD at which the user is present, etc.).

At block 272, then, the method 200 can comprise delivering the content or other information to the user, based on the detected presence of the user and/or any user preferences specifying whether/how content should be delivered. The term "user information" is used broadly herein to describe any type of content, user profile information, services, or other information that can be delivered to the user as described herein. Delivering the content to the user can comprise, for example, transmitting such content to the PDD at which the user is present, and/or to another device at the user's location. In other cases, delivering the content can comprise streaming the content to any such devices and/or making the content accessible for streaming by any such devices. In further cases, delivering the content to a user could comprise the control server providing information (such as user identification and/or device addressing information, such as an IP address) to another content source (such as a content server or content delivery network), for the other content source to deliver content to the PDD (or another user device). In this sense, the term "delivering" can include operations that facilitate the delivery of information to the user by another source and is not strictly to directly delivering the information from the control server. (Of course, in that situation, the separate content source could also be considered to be delivering the information to the user, within the scope of some embodiments.)

In other embodiments, delivering information to the user can include automatically providing access to services to which the user is entitled from the PDD at which the user is present (or another device in proximity to the PDD), regardless of whether the PDD (or other device) is owned by and/or associated with the user. For example, if the user is a subscriber to a video calling service, delivering information to the user can comprise automatically logging in to the video calling service from the PDD at which the user is present (e.g., a friend's or relative's PDD, or a PDD located at a vacation destination (e.g., hotel, vacation rental property, etc.)). As another example, delivering information to the user can comprise providing access to content sales or rental services from the PDD at which the user is present (e.g., automatically logging onto a content rental or sales service with the user's credentials from that presence detection device), where the content sales or rental services might provide a user (with the proper credentials) with access to purchases or rented video content, audio content, image content, and/or game content. Where the user is automatically authenticated by the PDD (e.g., by biometric analysis and authentication, or the like, which might be stored in the user's profile, along with login credentials for the user's accounts with content rental or sales services, video calling services, or the like), the PDD might access the user's profile, and might automatically log the user into any selected or preselected content rental or sales services, video calling services, or the like In some embodiments, the method 200 comprises determining that a user is no longer present at the PDD (block 276). For example, as noted above, the system might continuously and/or periodically capture images and perform presence determination techniques (e.g., as described above) to determine whether the user is still present, and/or might actively query the user after some period of time to determine whether the user is still present. If the system determines that the user is no longer present, the system can remove content from the PDD (block 280); for example, the system might delete any content transmitted to the device, log out of any services that the system had logged into from the device, revoke access to content stored in the cloud, and/or the like. This functionality is particularly useful and applicable to PDDs (or other devices) that are neither owned nor associated with the user (e.g., a friend's or relative's device, devices at a vacation hotel or vacation rental property, etc.). Such determination and content/access removal might, in some instances, be based on a time-out system (e.g., 5, 15, 30, or 60 minutes, etc.), in which the system might account for the user's temporary absence from the room, while protecting the access to profiles and/or content. In some cases, the user can select specific time-out periods, which can be stored in the user's profile, and such specific time-out periods can be universally applicable to some or all profiles, some or all media content, or some or all profiles and media content, or can be specific to particular profiles and/or media content. In some cases, user profiles might be associated with a much shorter time-out period (a time between 1-5 minutes) compared with media content (which might have a time-out period ranging from 15 minutes to 3 hours, or the like). The time-out system might be based on a counter or clock system that starts counting from the last time the system recognized that the user was in range of any of the sensors of the PDD. Any suitable techniques other than the time-out system described above may be implemented as appropriate.

The reader should note that a wide variety of presence-based functions (including without limitation those described in the Related Applications) can be performed by the system in conjunction with various techniques described as part of the method 200, and that such functions can be combined in any suitable way. Merely by way of example, the '603 application described advertising techniques that can be implemented based on detected presence, and such techniques can be integrated with various techniques described as part of the method 200. For instance, the system (e.g., the control server, the PDD, etc.) might obtain relevant advertising material as described in the '603 application and display such advertising over content obtained and delivered using the techniques of the method 200. Based on this disclosure, the skilled reader will understand that such techniques can be combined in a number of different ways.

Figure 3:
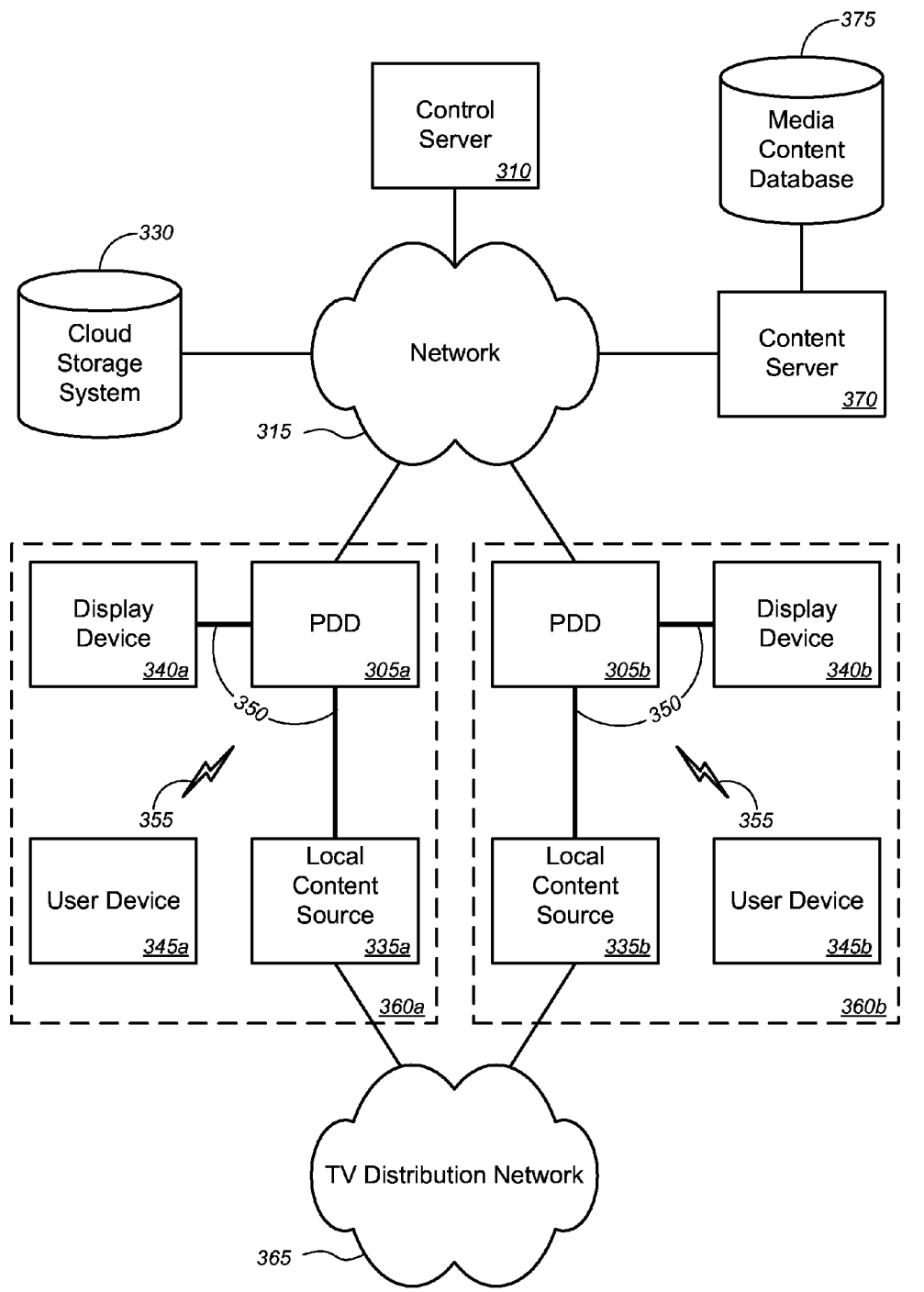
FIG. 3 is a block diagram illustrating another system for delivering content based on the presence of a user, in accordance with various embodiments.

FIG. 3 illustrates a functional diagram of a system 300 for controlling one or more PDDs 305 (which can be considered a type of user device 105). The skilled reader should note that the arrangement of the components illustrated in FIG. 3 is functional in nature, and that various embodiments can employ a variety of different structural architectures. Merely by way of example, one exemplary, generalized architecture for the system 300 is described below with respect to FIG. 5, but any number of suitable hardware arrangements can be employed in accordance with different embodiments.

In FIG. 3, PDD 305 might correspond to PDD 105, while user device 345 might correspond to non-PDD user device 105, both as described in detail above with respect to FIG. 1. Control server 310, network 315, and cloud storage system 330, in the example of FIG. 3, might correspond to control server 110, network 115, and cloud storage system 130, respectively, as described in detail above with respect to FIG. 1.

System 300 might further comprise a local content source 335 (e.g., a local content source as described above), a display device 340 (including, without limitation, a television ("TV")), and high-definition ("HD") data cables 350 (or any other suitable data transmission media). In some cases, the HD data cables 350 might include, without limitation, high-definition multimedia interface ("HDMI") cables or any other suitable HD data cables. One or more of the PDDs 305, as shown in FIG. 3, might be configured to provide pass-through audio and/or video from a local content source 335 to a display device 340 (e.g., using data cables 350). Merely by way of example, in some embodiments, a HD data input port (e.g., a HDMI input port) in the PDD 305 allows HD signals to be input from the corresponding local content source 335, and a HD data output port (e.g., a HDMI output port) in the PDD 305 allows HD signals to be output from the PDD 305 to the corresponding display device 340 (e.g., TV, which might include, but is not limited to, an Internet Protocol TV ("IPTV"), a HDTV, a cable TV, or the like). The output HD signal may, in some cases, be the input HD signal modified by the PDD 305. Local content source 335 might be any suitable local content source. As described herein, a local content source is any device that provides an audio or video stream to a display device (and thus can include, without limitation, a cable STB, a satellite STB, an IPTV STB, devices that generate video and/or audio, and/or acquire video and/or audio from other sources, such as the Internet, and provide that video/audio to a display device, and/or the like). Hence, when situated functionally inline between a local content source and a display device, the PDD can receive an audiovisual stream output from the local content source, modify that audiovisual stream in accordance with the methods described in the '182 patent, and provide the (perhaps modified) audiovisual stream as input to the display device 340. In some embodiments, PDD 305a, local content source 335a, display device 340a, and user device 345a (if any) might be located at a first customer premises 360a, while PDD 305b, local content source 335b, display device 340b, and user device 345b (if any) might be located at a second customer premises 360b.

According to some embodiments, system 300 might further comprise one or more access points (not shown), each of which might be located in proximity to or in the first customer premises 360a and/or the second customer premises 360b. The access point(s) can allow wireless communication between each PDD 305 and network 315. (Of course, a PDD 305 might also have a wired connection to an access point, router, residential gateway, etc., such as via an Ethernet cable, which can provide similar communication functionality.) In some cases (as shown), each PDD 305 might be communicatively coupled to network 315 (via either wired or wireless connection), without routing through any access points. In some cases, wired or wireless access to network 315 allows PDD 305 to obtain profiles from cloud storage system 330 and/or media content from content server 370 and media content database 375 independent of the corresponding local content source 335, which is in communication with a television ("TV") distribution network 365 (either via wireless connection or via wired connection). In some cases (not shown), TV distribution network 365 (which could be, for example, a cable television distribution network, a satellite television distribution network, an Internet Protocol television ("IPTV") distribution network, and/or the like) might be communicatively coupled with content server 370, and thus local content source 335 might obtain media content from content server 370 and media content database 375 independently of PDD 305. Alternatively or in addition, the television distribution network 365 might be communicatively coupled to other content servers and/or other media content sources (not shown).

In this manner, PDD 305 can overlay the input signal from the corresponding local content source 335 with additional media content to produce an augmented output HD signal to the corresponding display device 340 via data cables 350. This functionality allows for supplemental content (which may be associated with the media content accessed by the local content source 335 for display on display device 340) to be accessed and presented using the PDD 305, in some cases, as a combined presentation on the display device 340, which may be one of an overlay arrangement (e.g., a picture-in-picture ("PIP") display, with the supplemental content overlaid on the main content), a split screen arrangement (with the supplemental content adjacent to, but not obscuring any portion of the main content), a passive banner stream (with non-interactive supplemental content streaming in a banner(s) along one or more of a top, bottom, left, or right edge of a display field in which the main content is displayed on display device 340), and/or an interactive banner stream (with interactive supplemental content streaming in a banner(s) along one or more of a top, bottom, left, or right edge of a display field in which the main content is displayed on display device 340). Herein, examples of interactive supplemental content might include, without limitation, content that when streamed in a banner can be caused to slow, stop, and/or replay within the banner, in response to user interaction with the content and/or the banner (as opposed to passive banner streaming, in which information is streamed in a manner uncontrollable by the user). The interactive supplemental content that is streamed in the banner may, in some instances, also allow the user to invoke operations or functions by interacting therewith; for example, by the user highlighting and/or selecting the supplemental content (e.g., an icon or still photograph of a character, actor/actress, scene, etc. associated with the main content), links for related webpages, links to further content stored in media content database 375, or operations to display related content on display device 340 and/or user device 345 may be invoked.

In some instances, PDD 305 might detect the presence and/or proximity of one or more user devices 345 associated with the user, and might (based on user profile information associated with the user that is stored, e.g., in cloud storage system 330) automatically send supplemental media content via wireless link 355 (directly from PDD 305 or indirectly via an access point (not shown)) for display on a display screen(s) of the one or more user devices 345. In one non-limiting example, a user associated with PDD 305*a* might have established a user profile stored in cloud storage system 330 that indicates a user preference for any and all supplemental content for movies and television programs to be compiled and displayed on one or more user devices 345*a* (including, but not limited to, a tablet computer, a smart phone, a laptop computer, and/or a desktop computer, etc.) concurrent to display of the movie or television program being displayed on display device 340*a*. In such a case, when a movie is playing on display device 340*a* broadcast or streamed via local content source 335*a* from content server 365 and media content database 370 (and/or from some other content server and some other media content source) via network 365, PDD 305*a* accesses supplemental content (if available) from content server 365 and media content database 370 via network 315, and sends the supplemental content to the user's tablet computer and/or smart phone via wireless link(s) 355. For example, bios of actors, actresses, and/or crew might be sent to the user's smart phone for display on the screen thereof, while schematics of machines, weapons, robots, tools, etc. associated with the movie or television show might be sent to and displayed on the user's tablet computer, behind the scenes videos or information, news/reviews associated with the main content, and/or music videos associated with the main content may also be sent to the user's smart phone and/or tablet computer, and so on.

In some embodiments, gaming may be enhanced by the functionality described above. For example, a role-player game ("RPG") may be enhanced by supplemental content (including, but not limited to, player statistics, buy/sell/upgrade options for tools and weapons, communications with other in-game characters and/or live friends playing the game, etc.) may be routed through the user's smart phone, tablet computer, or other suitable user device, while the user is playing the RPG via the local content source/game console 335 and the display device 340. In some cases, the video game (in this case, a RPG) could be played on the PDD, which, as noted above, can be embodied by a video game console. This allows for player multitasking without taking away from the gameplay on the main display screen (i.e., the display device 340). For a first-person shooter game, similar multitasking functionality may be achieved. Cooperative game play may also be achieved using the functionality described above. In a non-limiting example, the user might control the shooting and the direct interactions with elements in the game using the main controls of the local content source/game console 335, while a friend uses the tablet computer (for example) to buy/sell/upgrade equipment and weapons, to communicate with other characters and/or players, to keep track of enemies, or the like. In an example of a jet fighter, tank, and/or space ship shooter game, or the like, the user might control the flight and weapons as displayed on display device 340, while the friend(s) keeps an eye on radar, lidar, sonar, or other sensor readings of enemy craft, handles status checks of weapons and ammunition, takes care of maintenance and repairs, and/or establishes communications with in-game characters and/or players as displayed on one or more user device 345. These are merely some examples of the myriad arrays of possibilities enabled by the functionalities described above, and thus are limited only by the imaginations of game developers and players for enhancing multiplayer/multitasking game play.

According to some embodiments, the detection of the presence of the user device 345 by the PDD 305 might allow identification of a user and thus access of profiles and/or content associated with the user's account, regardless of whether the PDD 305 is owned by and/or associated with the user. Herein, the user's media content might include, without limitation, at least one of video content, audio content, video game content, image content, and/or software application. In some cases, each of the at least one of video content, audio content, video game content, image content, or software application is one of purchased content, rented content, freely downloaded content, and/or user-generated content. The user's profiles might include, but are not limited to, one or more of user profile information for a video game or video game console, saved game information, web browser history and/or bookmarks, contact information for the user's contacts, user profile information for video or audio content, including without limitation recommended content, device preferences, user profile information for cloud services, and/or the like. In some cases, the user's profile might also include identifying information—including, but not limited to, the user's biometric information (e.g., facial characteristics, voice characteristics, fingerprint characteristics, iris characteristics, pupil characteristics, retinal characteristics, etc.), or the like. In some examples, the user profile information for cloud services might include user log-in information (e.g., username, account number, and/or password/passphrase, etc.) or other suitable credentials for cloud services, which might include, without limitation, video calling service, voice calling service, video broadcast/streaming service, audio broadcast/streaming service, on-line gaming service, banking/financial services, travel/accommodation/rental vehicle services, and/or dining/entertainment event reservation/ticketing services, or the like.

In one example, a user might be associated with PDD 305*a* (located in the first customer premises 360*a*), while her friend might be associated with PDD 305*b* (located in the second customer premises 360*b*), and the user and the friend are both subscribers of a similar service provided by control server 310 and/or the cloud service provider associated with control server 310. When the user visits her friend, the friend's PDD 305*b* might first detect presence of the user, by querying and/or obtaining the identification information for the user's smart phone and/or tablet computer or the like, by capturing video, image, and/or voice data of the user, by infrared detection of a living person in the room, and/or by audio detection of a living person in the room, etc. The friend's PDD 305*b* might then identify the user using the user's device(s) identification information and/or the captured video, image, and/or voice data, or might send such presence information to control server 310 for identification and authentication analysis. In some cases, detecting presence of, or identifying/authenticating, the user might include, without limitation, analyzing captured images or video segments using one or more of facial recognition software, pupil/iris recognition software, retinal identification software, fingerprint analysis software, and/or physiology recognition software, analyzing captured audio samples using one or more of voiceprint analysis and/or comparison with stored challenge/response information, and/or identification of a user device owned by and/or associated with the user (e.g., based on identification information of the device, which may be previously associated with the user or the user's profile(s), etc.). In terms of detection of the presence of the user's device, any suitable technique may be implemented including, but not limited to, at least one of detecting a Bluetooth connection of the user device, detecting that the user device is associated with a WiFi access point with which the PDD has associated, and/or communicating with the user device using near field communication ("NFC").

Once the user has been identified and authenticated, control server 310 might send copies of the user's profiles and/or content to PDD 305*b* (either from PDD 305*a* and/or from cloud storage system 330, or the like), or at least provide the user with access to her profiles and/or content from her friend's PDD 305*b*. In some embodiments, the identification and authentication processes might include comparing the user device identification information and/or the captured video, image, and/or voice data against all similar identification data for all users/subscribers of the cloud service that are stored in cloud storage system 330. In some cases, the process might be facilitated where PDDs 305*a* and 305*b* might already be associated with each other (e.g., where the user has previously made a video call from PDD 305*a* to her friend on PDD 305*b*, where the user might have added the friend to the user's contact list, and/or where the friend might have added the user to the friend's contact list). In other cases, the user's PDD 305*a* might have access to the user's calendar and/or communications, which might indicate that the user is visiting the friend. The PDD 305*a* might query control server 310 to determine whether the friend has a PDD 305*b* associated with the cloud service provider. In this example, the PDD 305*a* determines that PDD 305*b* is part of the same service and/or is in communication with control server 310, and based on such determination, PDD 305*a* (and/or control server 310) might send the user's profiles and/or content to PDD 305*b*, and/or provide PDD 305*b* with access to the user's profiles and/or content. In some embodiments, the user's profiles and/or content, or access to profiles and/or content, might be encrypted, and might be released/decrypted upon identification and/or authentication by PDD 305*b* (and/or by control server 310) when the user is detected by PDD 305*b*. In this manner, the user's profiles and/or content can follow the user wherever she goes, so long as there is a device (e.g., PDD) that is associated with the same or affiliate cloud service provider at her destination, and so long as the device can recognize and authenticate the user.

By the same token, if the user is no longer detected by the PDD 305*b*, either after a predetermined number of prompts or queries for the user and/or after a predetermined period of time (e.g., after a specified number of minutes, hours, days, weeks, months, etc.), PDD 305*b* (and/or control server 310) might determine that the user is no longer present at the location of PDD 335*b*. Based on such a determination, PDD 305*b* and/or control server 310 might remove the user's profiles and/or media content (or access thereto) from PDD 305*b*. As described above, a time-out system might be utilized. Alternatively, other suitable systems may be used for determining the user is no longer present, and removing the user's profiles and/or media content (or access thereto) from the PDD 305*b*.

Figure 4:
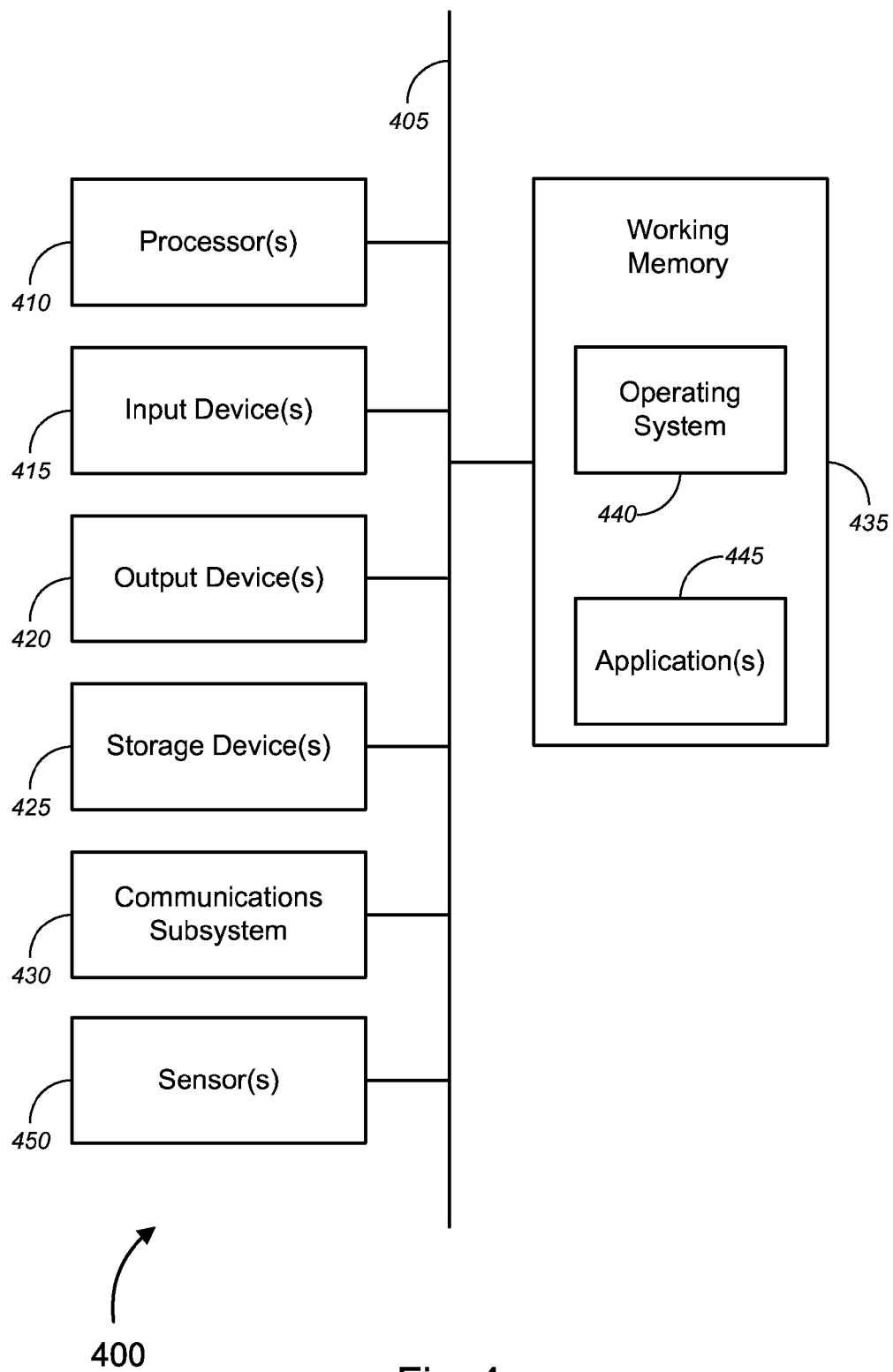
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as a PDD, user device, control server, web server, and/or the like. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

According to some embodiments, system 400 might further comprise one or more sensors 450, which might include, without limitation, one or more cameras, one or more IR sensors, and/or one or more 3D sensors, or the like. In some cases, the one or more sensors 450 might be incorporated in (or might otherwise be one of) the input device(s) 415. The output device(s) 420 might, in some embodiments, further include one or more monitors, one or more TVs, and/or one or more display screens, or the like.

The terms "machine readable medium" and "computer readable medium," as used herein, refer to any medium that participates in providing data that causes a machine to operate in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

As noted above, a set of embodiments comprises systems collecting presence information and/or delivering information (including, without limitation, profiles and/or content) to a user on a user device, based on presence information, regardless of whether the user device is owned by and/or associated with the user. FIG. 5 illustrates a schematic diagram of a system 500 that can be used in accordance with one set of embodiments. The system 500 can include one or more user computers 505. In particular, a user computer 505 can be a PDD, as described above. More generally, a user computer 505 can be a general purpose personal computer (including, merely by way of example, desktop computers, workstations, tablet computers, laptop computers, handheld computers, mobile phones, smart phones, and the like), running any appropriate operating system, several of which are available from vendors such as Apple, Microsoft Corp., as well as a variety of commercially-available UNIX™ or UNIX-like operating systems. A user computer 505 can also have any of a variety of applications, including one or more applications configured to perform methods provided by various embodiments (as described above, for example), as well as one or more office applications, database client and/or server applications, and/or web browser applications. Alternatively, a user computer 505 can be any other electronic device, such as a thin-client computer, Internet-enabled mobile telephone, and/or personal digital assistant, capable of communicating via a network (e.g., the network 510 described below) and/or of displaying and navigating web pages or other types of electronic documents. Although the exemplary system 500 is shown with two user computers 505, any number of user computers can be supported.

Certain embodiments operate in a networked environment, which can include a network 510. The network 510 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 510 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 515. Each of the server computers 515 may be configured with an operating system, including without limitation any of those discussed above with respect to the user computers 505, as well as any commercially (or freely) available server operating systems. Each of the servers 515 may also be running one or more applications, which can be configured to provide services to one or more clients 505 and/or other servers 515.

Merely by way of example, one of the servers 515 might be a control server, with the functionality described above. In another embodiment, one of the servers might be a web server, which can be used, merely by way of example, to provide communication between a user computer 505 and a control server, for example, to process requests for web pages or other electronic documents from user computers 505 and/or to provide user input to the control server. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform operations in accordance with methods provided by various embodiments.

The server computers 515, in some embodiments, might include one or more application servers, which can be configured with one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 505 and/or another server 515. In some embodiments, an application server can create web pages dynamically for displaying the information in accordance with various embodiments, such as providing a user interface for a control server, as described above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer 505 and/or server 515.

It should be noted that the functions described with respect to various servers herein (e.g., application server, database server, web server, file server, etc.) can be performed by a single server and/or a plurality of specialized servers, depending on implementation-specific needs and parameters. Further, as noted above, the functionality of one or more servers 515 might be implemented by one or more containers or virtual machines operating in a cloud environment and/or a distributed, cloud-like environment based on shared resources of a plurality of user PDDs.

In certain embodiments, the system can include one or more data stores 520. The nature and location of the data stores 520 is discretionary: merely by way of example, one data store 520 might comprise a database 520a that stores information about master accounts, assigned PDDs, etc. Alternatively and/or additionally, a data store 520b might be a cloud storage environment for storing uploaded images and/or video. As the skilled reader can appreciate, the database 520a and the cloud storage environment 520b might be collocated and/or separate from one another. Some or all of the data stores 520 might reside on a storage medium local to (and/or resident in) a server 515a. Conversely, any of the data stores 520 (and especially the cloud storage environment 520b) might be remote from any or all of the computers 505, 515, so long as it can be in communication (e.g., via the network 510) with one or more of these. In a particular set of embodiments, a database 520a can reside in a storage-area network ("SAN") familiar to those skilled in the art, and/or the cloud storage environment 520b might comprise one or more SANs. (Likewise, any necessary files for performing the functions attributed to the computers 505, 515 can be stored locally on the respective computer and/or remotely, as appropriate.) In one set of embodiments, the database 520a can be a relational database, such as an Oracle database, that is adapted to store, update, and retrieve data in response to SQL-formatted commands. The database might be controlled and/or maintained by a database server, as described above, for example.

As noted above, the system can also include one or more PDDs 525. Although only two such devices are illustrated in FIG. 5, it should be appreciated that any number of PDDs 525 can be controlled in accordance with various embodiments. Using the techniques described herein, a control server 515 can control the operation of the PDD(s) 525 e.g., by performing operations in accordance with the methods described above. The one or more PDDs 525 may also be established as distributed infrastructure elements for cloud computing, cloud-based application hosting, and/or cloud-based data storage, in accordance with the various embodiments described in detail in the Distributed Infrastructure Application (already incorporated herein). The one or more PDDs 525 might also serve the one or more functions of server 515 and/or database 520, as described in detail above.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
collecting presence information with a first video game play device that is located at a first customer premises associated with a first user, the first video game play device comprising:
a video input interface to receive video input from a local content source;
an audio input interface to receive audio input from the local content source;
a video output interface to provide video output to a video display device;
an audio output interface to provide audio output to an audio receiver;
a video capture device to capture at least one of image data or video data;
an audio capture device to capture audio data;
a network interface;
at least one processor; and
a storage medium in communication with the at least one processor;
detecting presence of a second user at the first customer premises, with the first video game play device, based at least in part on the presence information, wherein the presence information comprises at least one of an image captured by the video capture device or a video segment captured by the video capture device, and wherein both the first video game play device and the first customer premises are not associated with the second user;
identifying the second user by analyzing, with a first computer and using facial recognition software, identifying information derived from at least a portion of the presence information comprising the at least one of an image captured by the video capture device or a video segment captured by the video capture device; and
providing access to user information to the second user, with a second computer, based on the detected presence of the identified second user, wherein the user information comprises a user profile of the second user, wherein the user profile comprises one or more of user profile information for a video game, user profile information for the video game device, or saved game information.

2. The method of claim 1, wherein the video input interface and the audio input interface are both embodied as a first high definition multimedia interface ("HDMI") port communicatively coupled to the local content source via a first HDMI cable, and wherein the video output interface and the audio output interface are both embodied as a second HDMI port communicatively coupled to the video display device via a second HDMI cable, and wherein the audio receiver is incorporated within the video display device.

3. The method of claim 1, wherein the second computer and the first computer are the same computer.

4. The method of claim 1, wherein at least one of the first computer or the second computer is a control server in communication with the first video game play device over a network.

5. The method of claim 4, wherein providing access to user information to the second user comprises instructing the first video game play device to provide access to the user information to the second user.

6. The method of claim 1, wherein providing access to the user information to the second user comprises providing access to the user information over at least one of the video output interface or the audio output interface to a corresponding one of the video display device or the audio receiver.

7. The method of claim 1, wherein providing access to the user information to the second user comprises obtaining the user information from one or more of a location in a cloud computing system or a second video game play device remote from the first video game play device.

8. The method of claim 7, wherein the user information is obtained from the second video game play device remote from the first video game play device, and wherein the second video game play device is at least one of a user device owned by the second user or a user device associated with the second user.

9. The method of claim 1, further comprising:
   detecting, with the first video game play device, that the second user is no longer present.

10. The method of claim 9, wherein providing access to user information to the second user comprises transmitting the user information to the first video game play device, and wherein the method further comprises:
   removing the user information from the first video game play device, based on a determination that the second user is no longer present.

11. The method of claim 1, wherein the user information comprises at least one of video content, audio content, video game content, image content, or a software application.

12. The method of claim 11, wherein each of the at least one of video content, audio content, video game content, image content, or the software application is one of purchased content, rented content, freely downloaded content, or user-generated content.

13. The method of claim 1, wherein the user profile further comprises one or more of user profile information for video or audio content, user browser history, user profile information for recommended content, user profile information for contact information of contacts of the second user, user profile information for one or more cloud services, or user profile information for device preferences.

14. The method of claim 13, wherein the user profile comprises biometric information of the second user selected from a group consisting of facial characteristics of the second user, voice characteristics of the second user, fingerprint characteristics of the second user, iris characteristics of the second user, pupil characteristics of the second user, and retinal characteristics of the second user.

15. The method of claim 1, wherein providing access to the user information comprises logging into a service, from the first video game play device, with a credential of the second user.

16. The method of claim 15, wherein the service is a video calling service.

17. The method of claim 15, wherein the service is a content subscription service.

18. The method of claim 1, wherein collecting presence information comprises collecting presence information automatically, without user interaction.

19. The method of claim 1, further comprising:
   identifying the second user by authenticating the second user.

20. The method of claim 1, wherein the presence information further comprises an audio sample captured by the audio capture device, the method further comprising:
   identifying the second user by comparing, with the first computer, at least a portion of the audio sample with a voiceprint associated with the second user.

21. The method of claim 1, wherein the presence information further comprises an audio sample captured by the audio capture device, the method further comprising:
   identifying the second user by comparing, with the first computer, at least a portion of the audio sample with stored challenge/response information associated with the second user.

22. The method of claim 1, wherein the presence information further comprises a detected presence of a user device in proximity to the first video game play device, the method further comprising:
   identifying the second user by determining, with the first computer, whether a user device that is detected in proximity to the first video game play device is a device associated with the second user.

23. The method of claim 1, wherein the presence information further comprises a detected presence of a user device in proximity to the first video game play device, the method further comprising:
   identifying the second user by detecting a presence of a user device that is associated with the second user, based on at least one of detecting a Bluetooth connection of the user device, detecting that the user device is associated with a WiFi access point with which the first video game play device has associated, or communicating with the user device using near field communication ("NFC").

24. The method of claim 1, wherein the first video game play device is a video game console.

25. The method of claim 1, wherein the first video game play device is a user device selected from a group consisting of a laptop computer, a desktop computer, a mobile phone, a smart phone, a tablet computer, a personal computer, and a video communication device.

26. A video game play device that is located at a first customer premises associated with a first user, the video game play device comprising:
   a video input interface to receive video input from a local content source;
   an audio input interface to receive audio input from the local content source;
   a video output interface to provide video output to a video display device;
   an audio output interface to provide audio output to an audio receiver;
   a video capture device to capture at least one of image data or video data;
   an audio capture device to capture audio data;
   a network interface;
   at least one processor; and
   a storage medium in communication with the at least one processor, the storage medium having encoded thereon a set of instructions executable by the at least one processor to control operation of the video game play device, the set of instructions comprising:
      instructions to collect presence information;
      instructions to detect presence of a second user at the first customer premises, based at least in part on the presence information, wherein the presence information comprises at least one of an image captured by the video capture device or a video segment captured by the video capture device, and wherein both the first video game play device and the first customer premises are not associated with the second user;
      instructions to transmit, over the network interface, identifying information to a server over a network, based on detected presence of the second user, for the server to identify the second user by analyzing, using facial recognition software, the identifying information being derived from at least a portion of the presence information comprising the at least one of an image captured by the video capture device or a video segment captured by the video capture device;
      instructions to receive, over the network interface, user information based on an identity of the detected second user;
      instructions to present the user information to the second user, based on the detected presence of the identified second user, wherein the user information comprises a user profile of the second user, wherein the user profile comprises one or more of user profile information for a video game, user profile information for the video game device, or saved game information.

27. A system, comprising:
a computer, comprising:
- at least one first processor; and
- a first storage medium in communication with the at least one first processor, the first storage medium having encoded thereon a first set of instructions executable by the at least one first processor to control operation of one or more video game play devices, and at least one video game play device of the one or more video game play devices, the at least one video game play device being located at a first customer premises associated with a first user, the at least one video game play device comprising:
- a video input interface to receive video input from a local content source;
- an audio input interface to receive audio input from the local content source;
- a video output interface to provide video output to a video display device;
- an audio output interface to provide audio output to an audio receiver;
- a video capture device to capture at least one of image data or video data;
- an audio capture device to capture audio data;
- a network interface;
- at least one second processor; and
- a second storage medium in communication with the at least one second processor, the second storage medium having encoded thereon a second set of instructions executable by the at least one second processor to control operation of the at least one video game play device of the one or more video game play devices, wherein the second set of instructions comprises:
- instructions to collect presence information;
- instructions to detect presence of a second user at the first customer premises, based at least in part on the presence information, wherein the presence information comprises at least one of an image captured by the video capture device or a video segment captured by the video capture device, and wherein both the at least one video game play devices and the first customer premises are not associated with the second user; and wherein at least one of the first set of instructions or the second set of instructions comprises:
- instructions to identify the second user by analyzing, using facial recognition software, identifying information derived from at least a portion of the presence information comprising the at least one of an image captured by the video capture device or a video segment captured by the video capture device; and
- instructions to provide access to user information to the second user, based on the detected presence of the identified second user, wherein the user information comprises a user profile of the second user, wherein the user profile comprises one or more of user profile information for a video game, user profile information for the video game device, or saved game information.

28. The system of claim 27, wherein the computer is a server computer that is remote from the one or more video game play devices, and in communication with at least one of the one or more video game play devices over a network.

* * * * *